(12) United States Patent
Chen et al.

(10) Patent No.: US 12,499,931 B2
(45) Date of Patent: Dec. 16, 2025

(54) MEMORY DEVICE HAVING SEGMENTED DATA LINE STRUCTURE

(71) Applicant: AP MEMORY TECHNOLOGY CORPORATION, Hsinchu County (TW)

(72) Inventors: Wen-Liang Chen, Hsinchu County (TW); Lin Ma, Beaverton, OR (US)

(73) Assignee: AP MEMORY TECHNOLOGY CORPORATION, Hsinchu County (TW)

( * ) Notice: Subject to any disclaimer, the term of this patent is extended or adjusted under 35 U.S.C. 154(b) by 210 days.

(21) Appl. No.: 18/448,525

(22) Filed: Aug. 11, 2023

(65) Prior Publication Data

US 2024/0055045 A1    Feb. 15, 2024

Related U.S. Application Data

(60) Provisional application No. 63/371,257, filed on Aug. 12, 2022.

(51) Int. Cl.
| | | |
|---|---|---|
| *G11C 11/4094* | (2006.01) | |
| *G11C 11/4093* | (2006.01) | |
| *G11C 11/4097* | (2006.01) | |

(52) U.S. Cl.
CPC ...... *G11C 11/4094* (2013.01); *G11C 11/4093* (2013.01); *G11C 11/4097* (2013.01)

(58) Field of Classification Search
CPC ............ G11C 11/4094; G11C 11/4093; G11C 11/4097
See application file for complete search history.

(56) References Cited

U.S. PATENT DOCUMENTS

| | | | |
|---|---|---|---|
| 11,087,827 B1* | 8/2021 | He | ............... H10B 12/50 |
| 2004/0170049 A1 | 9/2004 | Proell et al. | |
| 2006/0233024 A1 | 10/2006 | Matick et al. | |
| 2009/0034347 A1 | 2/2009 | Demone | |
| 2011/0286283 A1* | 11/2011 | Lung | ........ G11C 16/0483 |
| | | | 438/257 |

(Continued)

FOREIGN PATENT DOCUMENTS

TW    201239885 A1    10/2012

OTHER PUBLICATIONS

Office action of the TW family patent application 201239885.
English abstract translation of the office action of the TW family patent application 201239885.

*Primary Examiner* — Min Huang
(74) *Attorney, Agent, or Firm* — WPAT, P.C.; Anthony King

(57) ABSTRACT

A memory device includes a plurality of sets of bitlines, a set of data lines and a column selection circuit. Each data line is segmented into line segments separated from each other. A first data line includes a first line segment and a second line segment adjacent to each other. A second data line includes a first line segment. The column selection circuit is configured to selectively a first bitline in a first set of bitlines and a first bitline in a second set of bitlines to the first line segment and the second line segment of the first data line, respectively, and to selectively couple a second bitline in the first set of bitlines and a second bitline in the second set of bitlines to the first line segment of the second data line.

20 Claims, 13 Drawing Sheets

(56) References Cited

U.S. PATENT DOCUMENTS

2012/0144085 A1\* 6/2012 Liaw ................. G11C 5/04
  710/305
2013/0336065 A1\* 12/2013 Morooka ........... G11C 16/3427
  365/185.17

\* cited by examiner

MEMORY DEVICE HAVING SEGMENTED DATA LINE STRUCTURE

PRIORITY CLAIM AND CROSS-REFERENCE

The present application claims priority to U.S. Provisional Patent Application No. 63/371,257, filed on Aug. 12, 2022, which is incorporated by reference herein in its entirety.

BACKGROUND

The present disclosure relates to memory devices, and more particularly, to a memory device having a segmented data line structure.

Dynamic random-access memory (DRAM) is widely used as a computer's main memory because of its cost-effectiveness. A DRAM device includes a plurality of memory cells, each of which can store a data bit and is usually implemented using a capacitor and a transistor. The capacitor can be charged or discharged to represent a value of the data bit stored in the memory cell. For example, an empty capacitor can denote a logical value of 0, and a fully charged capacitor can denote a logical value of 1. As the technology nodes shrinks, the memory cell gets smaller and the capacitor will store a very limited amount of charge. To provide data that can be interpreted properly, the DRAM device utilizes a sense amplifier to produce an output in the form of recognizable logic levels.

SUMMARY

The described embodiments provide a memory device having a segmented data line structure.

Some embodiments described herein may include a memory device. The memory device includes a plurality of sets of bitlines, a set of data lines and a column selection circuit. The sets of bitlines include a first set of bitlines and a second set of bitlines. Each data line in the set of data lines is segmented into a plurality of line segments separated from each other. The set of data lines includes a first data line and a second data line. The first data line includes a first line segment and a second line segment adjacent to each other, and the second data line includes a first line segment. The column selection circuit is configured to selectively couple a first bitline in the first set of bitlines and a first bitline in the second set of bitlines to the first line segment and the second line segment of the first data line, respectively, and to selectively couple a second bitline in the first set of bitlines and a second bitline in the second set of bitlines to the first line segment of the second data line.

Some embodiments described herein may include a memory device. The memory device includes a first bitline group, a second bitline group, a first data line, a second data line and a column selection circuit. Each of the first bitline group and the second bitline group includes a plurality of sets of bitlines. The first data line is segmented into a plurality of line segments separated from each other, and is arranged to transmit a first set of data bits. The second data line is segmented into a plurality of line segments separated from each other, and is arranged to transmit a second set of data bits. The column selection circuit is configured to selectively couple the sets of bitlines in the first bitline group to a first line segment and a second line segment of the first data line, and to a first line segment of the second data line. The column selection circuit is further configured to selectively couple the sets of bitlines in the second bitline group to the second line segment and a third line segment of the first data line, and to a second line segment of the second data line.

Some embodiments described herein may include a memory device. The memory device includes a plurality of sets of bitlines, a first data line, a second data line and a column selection circuit. The sets of bitlines include a first set of bitlines and a second set of bitlines. Each data line is segmented into a plurality of line segments separated from each other. The column selection circuit is configured to selectively couple a first bitline in the first set of bitlines and a first bitline in the second set of bitlines to a first line segment of the first data line, and to selectively couple a second bitline in the first set of bitlines and a second bitline in the second set of bitlines to a first line segment of the second data line. The first set of bitlines is arranged between the first bitline and the second bitline in the second set of bitlines.

With the use of the proposed data line segmentation scheme, a set of data lines of a memory device can be segmented into line segments to increase memory bandwidth without introducing physical gaps and/or dummy columns in a memory cell array. Data lines that have different numbers of line segments can be of a uniform data width with the use of line segment multiplexing, which can be implemented outside a sense amplifier region to maintain high memory cell density.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
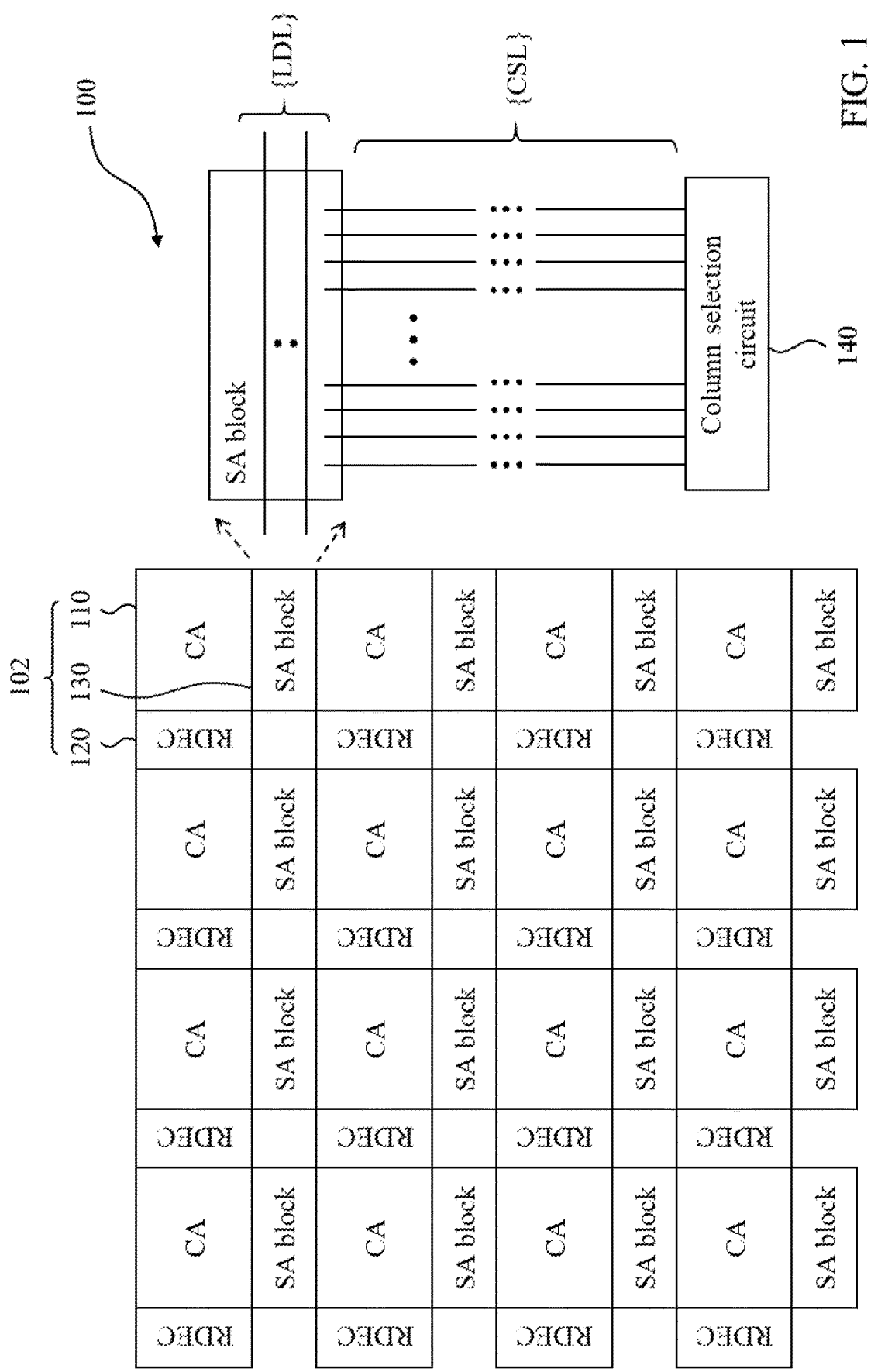
FIG. 1 is a diagram illustrating a partial physical implementation of a memory device in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed.

Further, it will be understood that when an element is referred to as being "connected to" or "coupled to" another element, it may be directly connected to or coupled to the other element, or intervening elements may be present.

FIG. 1 is a diagram illustrating a partial physical implementation of a memory device in accordance with some embodiments. In the example of FIG. 1, the memory device 100 can be implemented as a DRAM bank, which includes a plurality of tiles 102 arranged in an array. Each tile 102, also referred to as a memory array tile (MAT), may include a cell array (CA) 110, a row decoder (RDEC) 120 and a sense amplifier (SA) block 130. The cell array 110 includes a plurality of storage cells arranged in rows and columns. Storage cells in a given row share a common wordline (not shown) extending in a row direction; storage cells in a given column are coupled to a same bitline (not shown) extending in a column direction. The row decoder 120 is arranged for wordline activation. The sense amplifier block 130 is arranged to sense and amplify data signals on bitlines.

The memory device 100 may be implemented using, but is not limited to, open bitline architecture. For example, in a given row of the cell array 110, a part of storage cells arranged in the row is coupled to one sense amplifier block on the top of the cell array 110 through a part of the bitlines, and another part of the storage cells is coupled to another sense amplifier block on the bottom of the cell array 110 through another part of the bitlines.

The memory device 100 may further include a column selection circuit 140, which is arranged to select sense amplifiers from a sense amplifier block and couple the selected sense amplifiers to a set of data lines. For example, each bitline arranged in the cell array 110 is coupled to an associated sense amplifier of the sense amplifier block 130. The column selection circuit 140 can be configured to activate a column select line in a set of column select lines {CSL} to thereby select a set of bitlines arranged in the cell array 110, and accordingly couple the selected set of bitlines to a set of data lines {LDL}. Each data line in the set of data lines {LDL} can be shared across multiple columns of storage cells in the cell array 110. Note that the memory device 100 may be implemented to have a hierarchical structure, in which the set of data lines {LDL} may be referred to as a set of local data lines that is coupled to a set of global data lines (not shown) arranged along the column direction.

Figure 2:
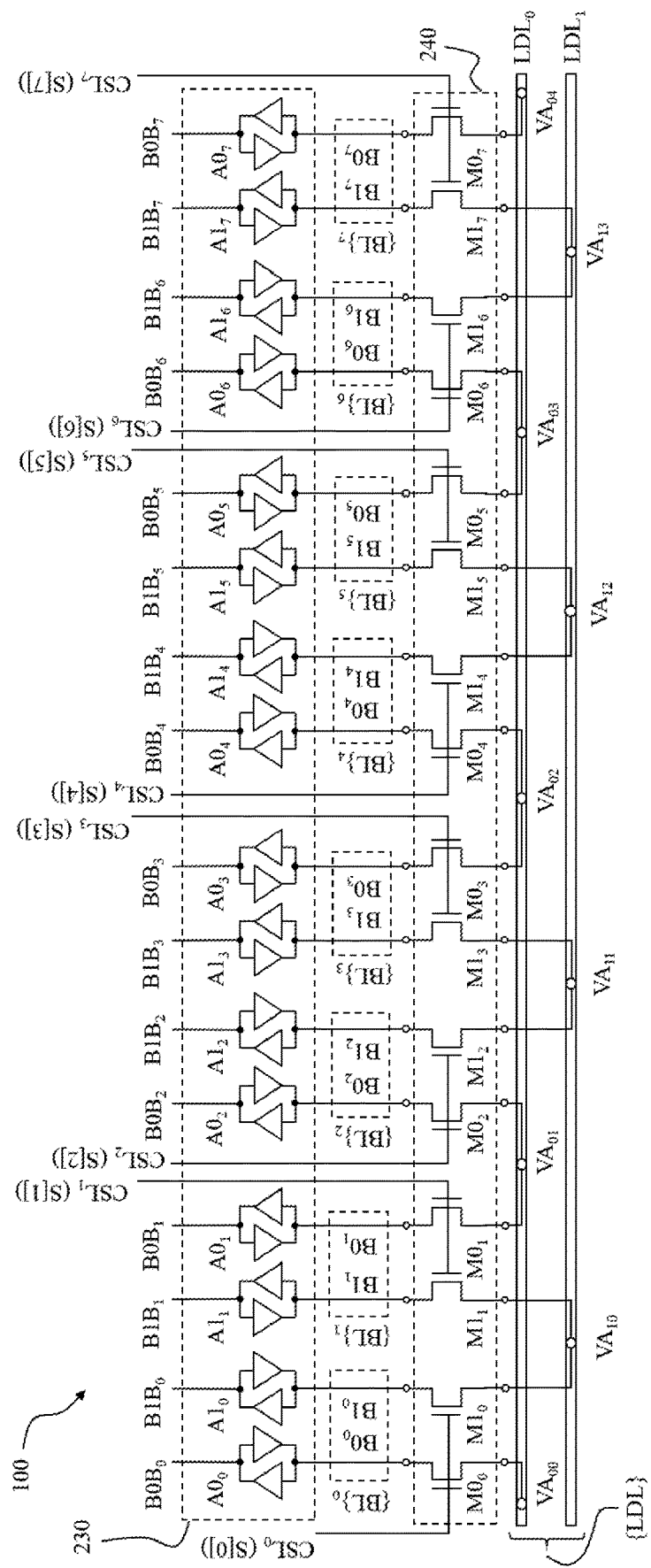
FIG. 2 illustrates an implementation of a portion of the memory device shown in FIG. 1 in accordance with some embodiments.

FIG. 2 illustrates an implementation of a portion of the memory device 100 shown in FIG. 1 in accordance with some embodiments. In the example of FIG. 2, the set of data lines {LDL} shown in FIG. 1 can be implemented to include a plurality of data lines $LDL_0$ and $LDL_1$, which are shared across the sense amplifier block 230. The column selection circuit 240, controlled by a set of column select signals S[0]-S[7] on the column select lines $CSL_0$-$CSL_7$, can be configured to select a set of bitlines from among a plurality of sets of bitlines $\{BL\}_0$-$\{BL\}_7$ that are coupled to the sense amplifier block 230. The sense amplifier block 230 and the column selection circuit 240 can serve as embodiments of the sense amplifier block 130 and the column selection circuit 140 shown in FIG. 1, respectively. In addition, the column select lines $CSL_0$-$CSL_7$ can serve as an embodiment of the set of column select lines {CSL} shown in FIG. 1.

The sense amplifier block 230 may include a plurality of sense amplifiers $A0_0$-$A0_7$ and $A1_0$-$A1_7$, each of which is coupled to a bitline (i.e. one of the bitlines $B0_0$-$B0_7$ and $B0_0$-$B1_7$) and a complementary bitline (i.e. one of the complementary bitlines $B0B_0$-$B0B_7$ and $B1B_0$-$B1B_7$). Each sense amplifier can be implemented using a pair of cross-coupled inverters. In addition, the column selection circuit 240 can be configured to select a set of bitlines from among the sets of bitlines $\{BL\}_0$-$\{BL\}_7$, and couple the selected set of bitlines to the set of data lines {LDL}. For example, the column selection circuit 240 can be configured to couple the bitlines $B0_i$ and $B1_i$ in the same set of bitlines $\{BL\}_i$ to the data lines $LDL_0$ and $LDL_1$, respectively, according to the same column select signal S[i], where i=0, . . . , 7.

In the example of FIG. 2, each bitline can be coupled to a corresponding data line through the column selection circuit 240 and a corresponding conductive structure (e.g. one of the conductive structures $VA_{00}$-$VA_{04}$ and $VA_{10}$-$VA_{13}$). Two adjacent bitlines that are selected in response to activation of different column select lines can be coupled to the same data line through a shared conductive structure, such as a conductive via or a contact element. For example, the bitlines $B0_1$ and $B0_2$ can be coupled to the data line $LDL_0$ through a shared conductive structure $VA_{01}$. Similarly, the bitlines $B1_0$ and $B1_1$ can be coupled to the data line $LDL_1$ through a shared conductive structure $VA_{10}$.

The column selection circuit 240 may include, but is not limited to, a plurality of transistors $M0_0$-$M0_7$ and $M1_0$-$M1_7$. The transistor $M0_i$ is arranged to selectively couple the bitline $B0_i$ to the data line $LDL_0$ according to the column select signal S[i], where i=0, . . . , 7. Thus, the data line $LDL_0$ can be shared across the sense amplifiers $A0_0$-$A0_7$, which are coupled to the bitlines $B0_0$-$B0_7$ respectively. Similarly, the transistor M1i is arranged to selectively couple the bitline $B1_i$ to the data line $LDL_1$ according to the column select signal S[i], where i=0, . . . , 7. The data line $LDL_1$ can be shared across the sense amplifiers $A1_0$-$A1_7$, which are coupled to the bitlines $B1_0$-$B1_7$ respectively.

In operation, when one of the column select lines $CSL_0$-$CSL_7$ is activated, the other column select lines are inactivated, and a set of bitlines corresponding to the activated column select line can be coupled to the set of data lines {LDL}. For example, when the column select signal S[0] is logically high, each of the column select signals S[1]-S[7] is logically low. A set of transistors (i.e. the transistors $M0_0$ and $M1_0$) is turned on, while the other transistors are turned off. The set of bitlines $\{BL\}_0$ (i.e. the bitlines $B0_0$ and $B1_0$) is coupled to the set of data lines {LDL}.

Figure 3:
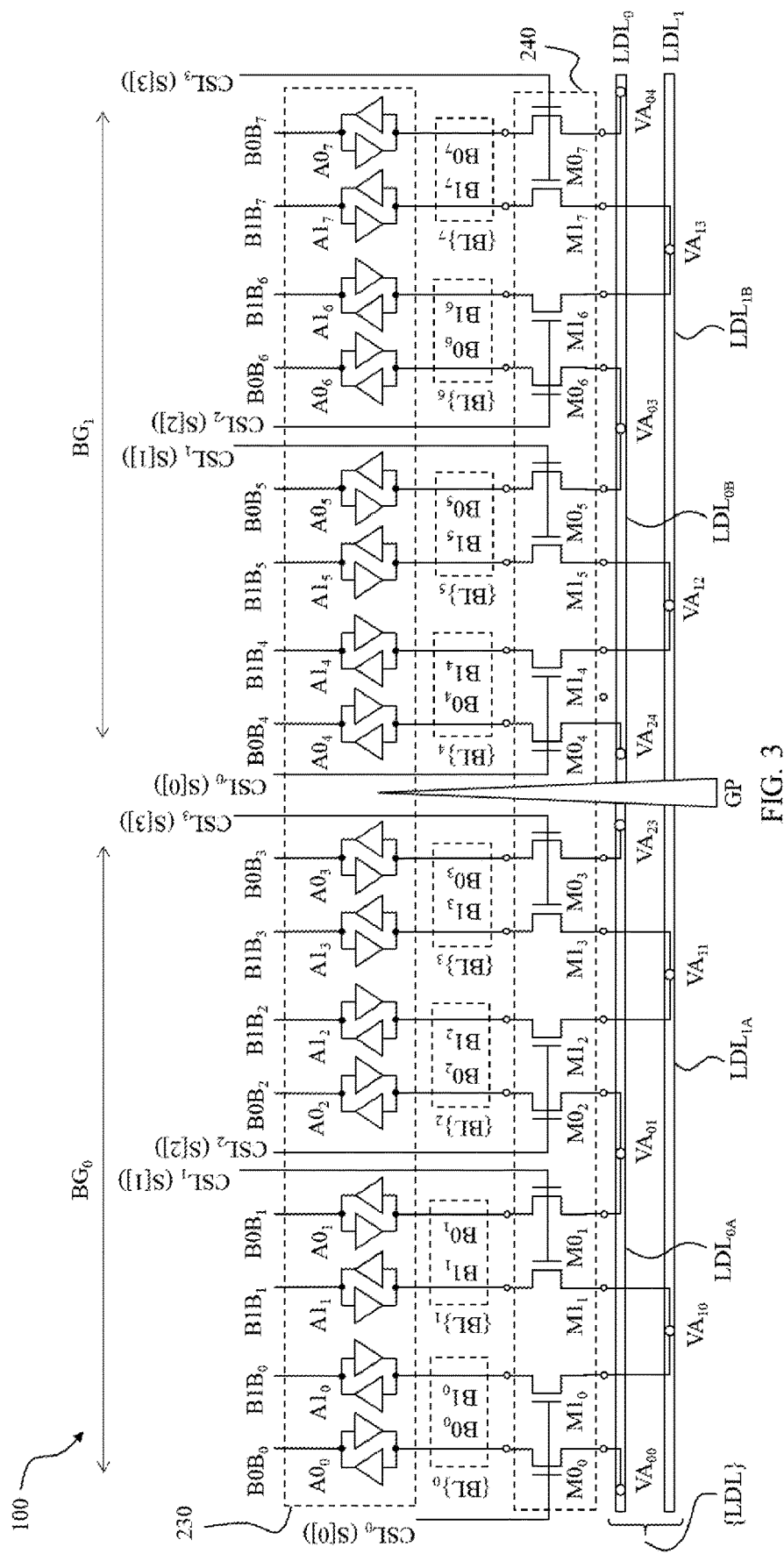
FIG. 3 illustrates an implementation of a portion of the memory device shown in FIG. 1 in accordance with some embodiments.

To increase memory bandwidth, a data line shared across a sense amplifier block may be segmented into multiple line segments. FIG. 3 illustrates an implementation of a portion of the memory device 100 shown in FIG. 1 in accordance with some embodiments. The arrangement of the set of data lines {LDL} shown in FIG. 3 is identical/similar to that of the set of data lines {LDL} shown in FIG. 2 except that the data line $LDL_0/LDL_1$ is segmented into line segments.

In the example of FIG. 3, the sets of bitlines $\{BL\}_0$-$\{BL\}_7$ can be divided into two bitline groups $BG_0$ and $BG_1$. The bitline group $BG_0$ includes the sets of bitlines $\{BL\}_0$-$\{BL\}_3$, and the bitline group $BG_1$ includes the sets of bitlines $\{BL\}_4$-$\{BL\}_7$. When one of the column select lines $CSL_0$-$CSL_3$ is activated, a corresponding set of bitlines in each bitline group is selected and coupled to the set of data lines {LDL}. For example, the sets of bitlines $\{BL\}_0$ and $\{BL\}_4$ can be selected in response to the activation of the column select line $CSL_0$. The bitlines $B0_0$ and $B1_0$ can be coupled to the line segments $LDL_{0A}$ and $LDL_{1A}$, respectively. The bitlines $B0_4$ and $B1_4$ can be coupled to the line segments $LDL_{0B}$ and $LDL_{1B}$, respectively.

In addition, when one of the column select lines $CSL_0$-$CSL_3$ is activated, memory data transmitted on the data line $LDL_0$ includes data bits carried by the line segments $LDL_{0A}$ and $LDL_{0B}$. In other words, the line segments $LDL_{0A}$ and $LDL_{0B}$ are arranged for transmitting different data bits of the memory data. However, separate conductive structures $VA_{23}$ and $VA_{24}$, rather than a shared conductive structure, would be needed to couple the bitlines $B0_3$ and $B0_4$ to the line segments $LDL_{0A}$ and $LDL_{0B}$, respectively. A physical gap GP is therefore introduced for providing sufficient space between the conductive structures $VA_{23}$ and $VA_{24}$, resulting in an increase in chip area and cost. Moreover, the cell array (e.g. the cell array 110 shown in FIG. 1) will introduce dummy columns to accommodate the gap created in the sense amplifier block 230. Storage cells in each dummy column are left unused during data access, and hence are a waste of chip area.

The present disclosure describes exemplary memory devices, each of which includes a set of data lines that can be segmented into multiple line segments without introducing a physical gap in a memory cell array. For example, each data line included in the exemplary memory device can be segmented at predetermined locations. Each predetermined location lies between two adjacent conductive structures, at least one of which can be shared across two bitlines. Thus, segmenting a data line into line segments would not introduce a physical gap formed between two adjacent conductive structures that are each dedicated to a single bitline.

In some embodiments, each data line can be segmented into more than two line segments. In some embodiments, data lines arranged for transmitting the same number of data bits can be segmented into different numbers of line segments. In some embodiments, line segments of a data line can be multiplexed to accordingly form data of a predetermined bit width. The multiplexing of the line segments may, for example, be implemented outside the sense amplifier region. As another example, the multiplexing of the line segments can be implemented on a wafer that is stacked above or below another wafer where the data line is formed.

With the use of the proposed data line segmentation scheme, a memory device can have high input/output (I/O) bandwidth without introducing physical gaps and/or dummy columns in a memory cell array thereof. For illustrative purposes, the proposed data line segmentation scheme is described below with reference to the segmentation of the set of data lines {LDL} shown in FIG. 2. Those skilled in the art should appreciate that the proposed data line segmentation scheme can be applied to other data line configurations, or applied to other memory devices which include data lines shared across bitlines, without departing from the scope of the present disclosure.

Figure 4:
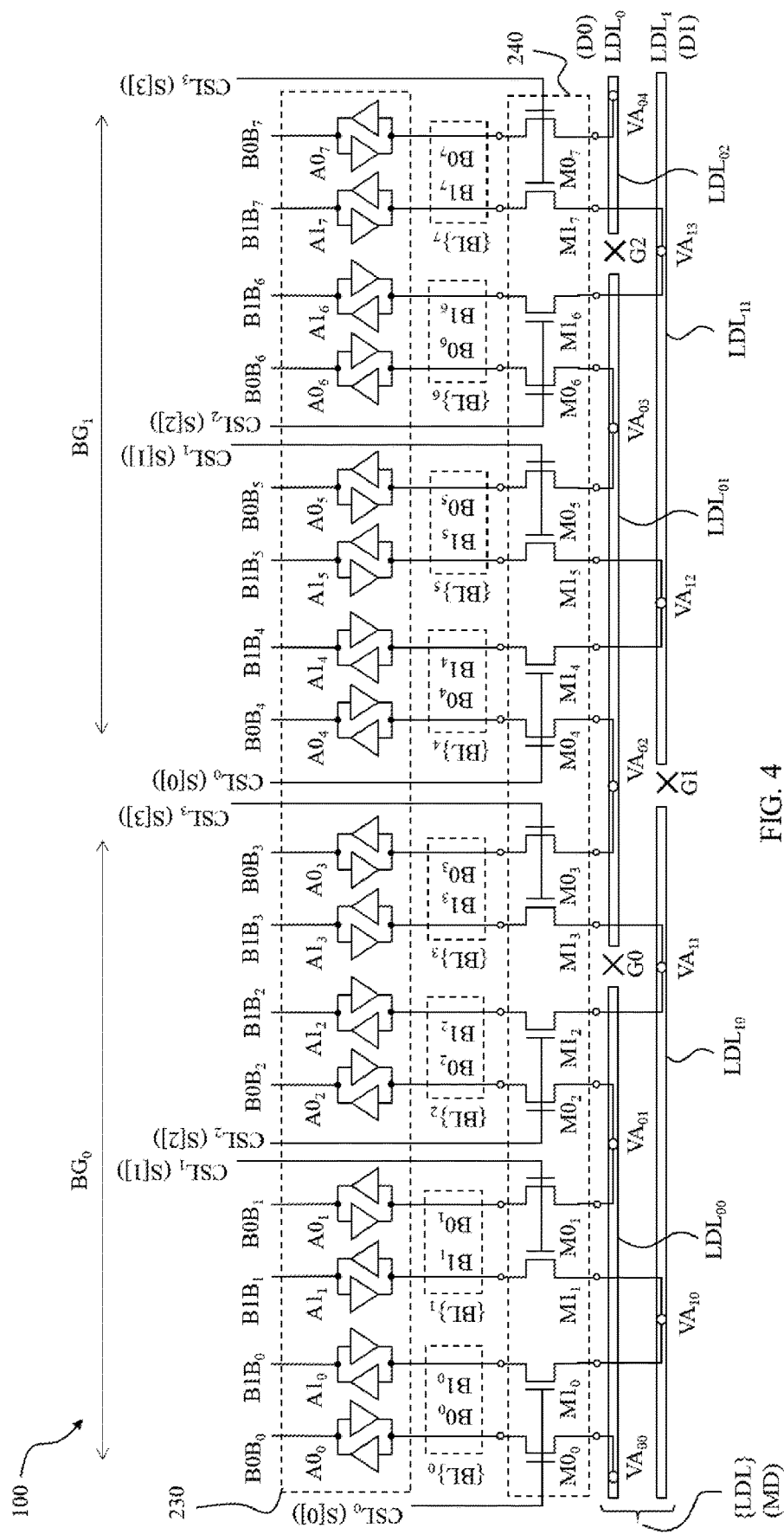
FIG. 4 illustrates an implementation of a portion of the memory device shown in FIG. 1 in accordance with some embodiments of the present disclosure.

FIG. 4 illustrates an implementation of a portion of the memory device 100 shown in FIG. 1 in accordance with some embodiments of the present disclosure. The arrangement of the set of data lines {LDL} shown in FIG. 4 is identical/similar to that of the set of data lines {LDL} shown in FIG. 2 except that the data line $LDL_0/LDL_1$ is segmented into line segments separated from each other. Note that the data line $LDL_0$ and the data line $LDL_1$ can segmented into a first number of line segments and a second number of line segments, respectively. The second number can be different from the first number.

In the present embodiment, the data line $LDL_0$ is segmented into line segments $LDL_{00}$-$LDL_{02}$, and the data line $LDL_1$ is segmented into line segments $LDL_{10}$ and $LDL_{11}$. The gap G0/G1/G2 created between two adjacent line segments is represented by the symbol X. Each gap is located between two adjacent conductive structures, at least one of which is shared across two bitlines. For example, the gap G0 is located between the conductive structures $VA_{01}$ and $VA_{02}$, which are each shared across two bitlines. As another example, the gap G2 is located between the conductive structures $VA_{03}$ and $VA_{04}$, and at least the conductive structure $VA_{03}$ is shared across two bitlines. Note that the conductive structure arrangement shown in FIG. 4 can be substantially identical to that shown in FIG. 2. The data line segmentation scheme shown in FIG. 4 can increase I/O bandwidth without introducing additional conductive structures and physical gaps. There can be no dummy storage cells arranged between two adjacent bitlines near a gap (e.g. the bitlines $B1_2$ and $B1_3$ near the gap G0).

In addition, two sets of bitlines near a gap can be coupled to two adjacent line segments of one data line while coupled to a same line segment of another data line. For example, the bitline $B0_2$ in the set of bitlines $\{BL\}_2$ and a first bitline $B0_3$ in the set of bitlines $\{BL\}_3$ are selectively coupled to the line segment $LDL_{00}$ and the line segment $LDL_{01}$ of the data line $LDL_0$ through the column selection circuit 240, respectively; the bitline $B1_2$ in the set of bitlines $\{BL\}_2$ and the bitline $B1_3$ in the set of bitlines $\{BL\}_3$ are each selectively coupled to the line segment $LDL_{10}$ of the data line $LDL_1$ through the column selection circuit 240.

In the example of FIG. 4, the sets of bitlines $\{BL\}_0$-$\{BL\}_7$ can be divided into two bitline groups $BG_0$ and $BG_1$. The bitline group $BG_0$ includes the sets of bitlines $\{BL\}_0$-$\{BL\}_3$, and the bitline group $BG_1$ includes the sets of bitlines $\{BL\}_4$-$\{BL\}_7$. The column selection circuit 240 can be configured to select one set of bitlines from each bitline group, and couple the selected set of bitlines to the set of data lines {LDL}. Bitlines in the selected set of bitlines can be coupled to the data line $LDL_0$ and the data line $LDL_1$, respectively. For example, the column selection circuit 240 may couple the set of bitlines $\{BL\}_0$ in the bitline group $BG_0$ and the set of bitlines $\{BL\}_4$ in the bitline group $BG_1$ to the set of data lines {LDL} in response to activation of the column select line $CSL_0$. The bitlines $B0_0$ and $B0_4$ are coupled to the data line $LDL_0$, and the bitlines $B1_0$ and $B1_4$ are coupled to and the data line $LDL_1$.

Moreover, the column selection circuit 240 can be arranged to couple the sets of bitlines in the one bitline group to a first line segment and a second line segment of the data line $LDL_0$, and to a first line segment of the data line $LDL_1$. The column selection circuit 240 can be further arranged to couple the sets of bitlines in the another bitline group to the second line segment and a third line segment of the data line $LDL_0$, and to a second line segment of the data line $LDL_1$. Different bitlines in the same bitline group may be coupled to separate line segments of the same data line. For example, the bitline $B0_0/B0_1/B0_2$ in the bitline group $BG_0$ can be coupled to the line segment $LDL_{00}$ when selected by the column selection circuit 240; the bitline $B0_3$ in the bitline group $BG_0$ can be coupled to the line segment $LDL_{01}$ when selected by the column selection circuit 240.

In operation, when one of the column select lines $CSL_0$-$CSL_3$ is activated, the other column select lines are inactivated. The column selection circuit 240 can couple a corresponding set of bitlines in each bitline group to the set of data lines {LDL} to thereby transmit memory data MD, which may be inputted to or outputted from a cell array. The data line $LDL_0$ can be arranged to transmit (i.e. input or output) a set of data bits D0 of the memory data MD, and the data line $LDL_1$ can be arranged to transmit a set of data bits D1 of the memory data MD. For brevity, the operation of the memory device 100 is described by outputting the data from the cell array to the data lines $LDL_0$ and $LDL_1$. This is not a limitation of the present invention. Those skilled in the art should appreciate that inputting the data into the cell array from the data lines $LDL_0$ and $LDL_1$ also belongs to the scope of the present invention.

For example, when the column select line $CSL_0$ is activated, the transistors $M0_o$ and $M1_o$ are turned on to select the set of bitlines $\{BL\}_0$ in the bitline group $BG_0$. The bitline $B0_0$ is coupled to the line segment $LDL_{00}$ of the data line $LDL_0$ to output a data bit in the set of data bits D0. The bitline $B1_0$ is coupled to the line segment $LDL_{10}$ of the data line $LDL_1$ to output a data bit in the set of data bits D1. Similarly, when the column select line $CSL_1/CSL_2$ is activated, the line segment $LDL_{00}$ can be arranged to output a data bit in the set of data bits D0, and the line segment $LDL_{10}$ can be arranged to output a data bit in the set of data bits D1. In addition, when the column select line $CSL_3$ is activated, the bitline $B0_3$ is coupled to the line segment $LDL_{01}$ separated from the line segment $LDL_{00}$, thereby outputting a data bit in the set of data bits D0. The bitline $B1_3$ is coupled to the line segment $LDL_{10}$ in response to activation of the column select line $CSL_3$, thereby outputting a data bit in the set of data bits D1.

With regard to the bitline group $BG_1$, when the column select line $CSL_0$ is activated, the column selection circuit 240 can couple the bitline $B0_4$ to the line segment $LDL_{01}$ to thereby output a data bit in the set of data bits D0. The column selection circuit 240 can further couple the bitline $B1_4$ to the line segment $LDL_{11}$ to thereby output a data bit in the set of data bits D1. Similarly, when the column select line $CSL_1/CSL_2$ is activated, the line segment $LDL_{01}$ can be arranged to output a data bit in the set of data bits D0, and the line segment $LDL_{11}$ can be arranged to output a data bit in the set of data bits D1. When the column select line $CSL_3$ is activated, the column selection circuit 240 can couple the bitlines $B0_7$ and $B1_7$ to the line segments $LDL_{02}$ and $LDL_{11}$, respectively.

In some embodiments, a predetermined data bit in the set of data bits D0 can be transmitted on the line segment $LDL_{00}$ when the set of bitlines $\{BL\}o/\{BL\}_1/\{BL\}_2$ is selected, and can be transmitted on the line segment $LDL_{01}$ when the set of bitlines $\{BL\}_3$ is selected. In other words, when the set of bitlines $\{BL\}_0/\{BL\}_1/\{BL\}_2$ is selected, the column selection circuit 240 is configured to couple the bitline $B0_0/B0_1/B0_2$ to the line segment $LDL_{00}$ of the data line $LDL_0$ to output the predetermined data bit; when the set of bitlines $\{BL\}_3$ is selected, the column selection circuit 240 is configured to couple the bitline $B0_3$ to the line segment $LDL_{01}$ of the data line $LDL_0$ to output the predetermined data bit. In addition, another predetermined data bit in the set of data bits D0 can be outputted on the line segment $LDL_{01}$ when the set of bitlines $\{BL\}_4/\{BL\}_5/\{BL\}_6$ is selected, and can be outputted on the line segment $LDL_{02}$ when the set of bitlines $\{BL\}_7$ is selected. Thus, the data lines $LDL_0$ and $LDL_1$ that differ in the number of line segments may have different data width. Specifically, in this embodiment, the data width of the data line $LDL_0$ is 3 bits and the data width of the data line $LDL_1$ is 2 bits. In the following FIG. 5 and related paragraphs, a method is proposed to make the data lines $LDL_0$ and $LDL_1$ to be of uniform data width (e.g. 2 bits).

For example, when the column select line $CSL_0/CSL_1/CSL_2$ is activated, the line segments $LDL_{00}$ and $LDL_{01}$ of the data line $LDL_0$ can be arranged to output a first data bit and a second data bit of the set of data bits D0, respectively. When the column select line $CSL_3$ is activated, the line segments $LDL_{01}$ and $LDL_{02}$ of the data line $LDL_0$ can be arranged to output the second data bit and the third data bit of the set of data bits D0, respectively. On the other hand, with regard to the data line $LDL_1$, the line segments $LDL_{10}$ and $LDL_{11}$ can be arranged to output a first data bit and a second data bit of the set of data bits D1, respectively, in response to the activation of the column select line $CSL_0/CSL_1/CSL_2/CSL_3$.

Note that bitlines selected in response to activation of a same column select line can be regarded as belonging to a same set of bitlines in the memory device 100. For example, the bitlines $B0_0$, $B1_0$, $B0_4$ and $B1_4$ can be regarded as belonging to the same set of bitlines in the memory device 100 since they can be selected in response to activation of the same column select line $CSL_0$. Similarly, the bitlines $B0_1$, $B1_1$, $B0_5$ and $B1_5$ can be regarded as belonging to the same set of bitlines; the bitlines $B0_2$, $B1_2$, $B0_6$ and $B1_6$ can be regarded as belonging to the same set of bitlines; the bitlines $B0_3$, $B1_3$, $B0_7$ and $B1_7$ can be regarded as belonging to the same set of bitlines.

Figure 5:
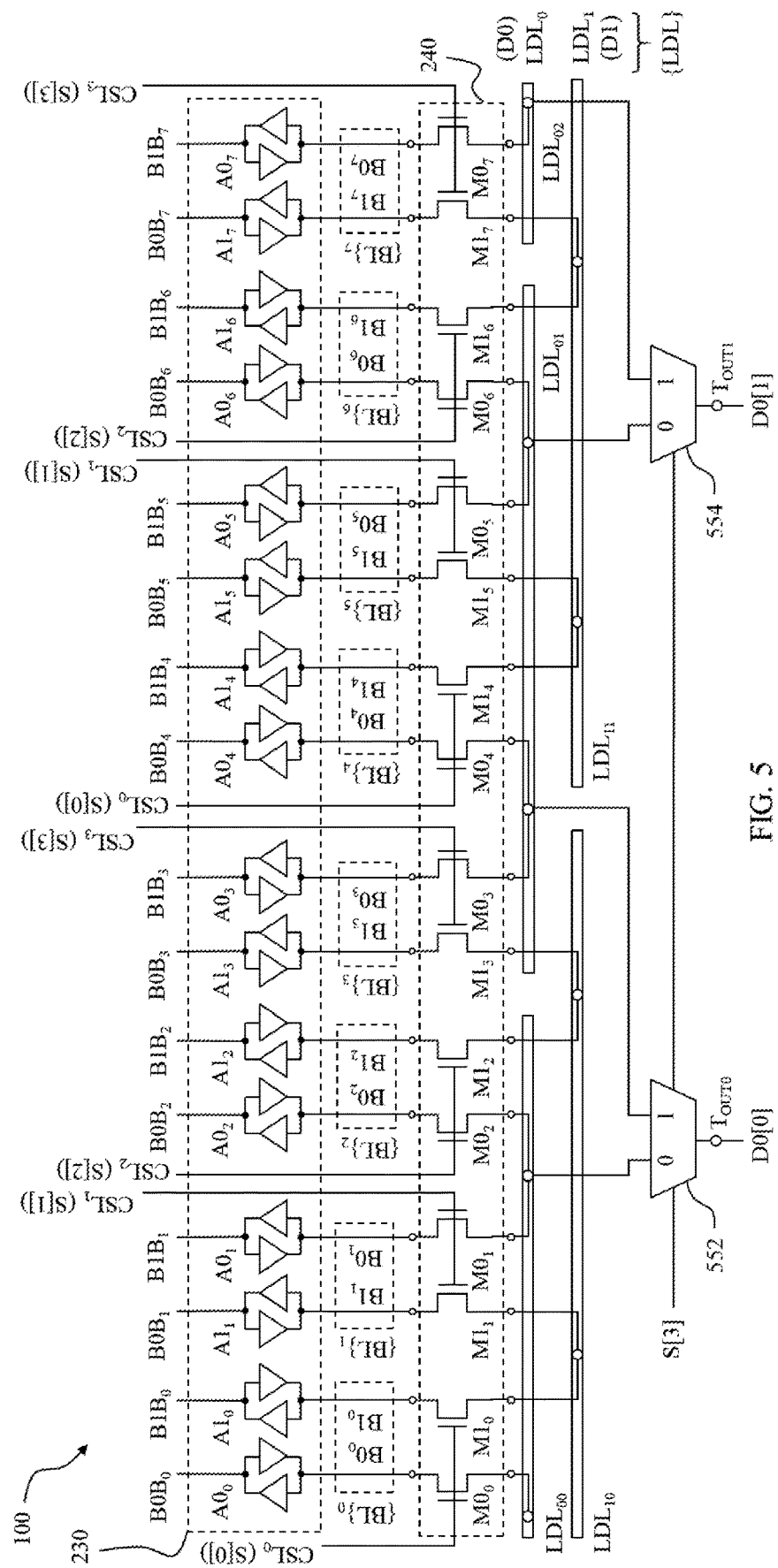
FIG. 5 illustrates an implementation of multiplexing of the line segments shown in FIG. 4 in accordance with some embodiments of the present disclosure.

In some embodiments, line segments of the data line $LDL_0$ can be multiplexed to make the data width of the data lines $LDL_0$ to be equal to that of the data line $LDL_1$. FIG. 5 illustrates an implementation of multiplexing of the line segments $LDL_{00}$-$LDL_{02}$ shown in FIG. 4 in accordance with some embodiments of the present disclosure. In the present embodiment, the memory device 100 may further include a plurality of multiplexer circuits 552 and 554. Each of the multiplexer circuits 552 and 554 may be disposed outside a sense amplifier region in which the sense amplifier block 230 is implemented.

The multiplexer circuit 552 can be configured to couple one of the line segments $LDL_{00}$ and $LDL_{01}$ to an output terminal $T_{OUT0}$ thereof according to whether a predetermined set of bitlines is selected. For example, the multiplexer circuit 552 can be configured to receive the column select signal S[3], which can indicate whether the set of bitlines $\{BL\}_3$ is selected. When the set of bitlines $\{BL\}_3$ is unselected, the column select signal S[3] is logically low. The multiplexer circuit 552 can couple the line segment $LDL_{00}$ to the output terminal $T_{OUT0}$ according to the column select signal S[3]. When the set of bitlines $\{BL\}_3$ is selected, the column select signal S[3] is logically high. The multiplexer circuit 552 can couple the line segment $LDL_{01}$ to the output terminal $T_{OUT0}$ according to the column select signal S[3].

Similarly, the multiplexer circuit 554 can be configured to couple one of the line segments $LDL_{01}$ and $LDL_{02}$ to an output terminal $T_{OUT1}$ thereof according to whether a predetermined set of bitlines is selected. In the example of FIG. 5, the multiplexer circuit 554 can be configured to receive the column select signal S[3] to select one of the line segments $LDL_{01}$ and $LDL_{02}$, thereby coupling the selected line segment to the output terminal $T_{OUT1}$.

In operation, when the column select line $CSL_0/CSL_1/CSL_2$ is activated to select a corresponding set of bitlines in each bitline group, the line segments $LDL_{00}$ and $LDL_{01}$ are coupled to the output terminals $T_{OUT0}$ and $T_{OUT1}$, respectively. The data bits D0[0] and D0[1] correspond to respective data bits transmitted on the line segments $LDL_{00}$ and $LDL_{01}$. When the column select line $CSL_3$ is activated to select a corresponding set of bitlines in each bitline group, the line segments $LDL_{01}$ and $LDL_{02}$ are coupled to the output terminals $T_{OUT0}$ and $T_{OUT1}$, respectively. The data bits D0[0] and D0[1] correspond to respective data bits transmitted on the line segments $LDL_{01}$ and $LDL_{02}$. In other words, the multiplexer circuits 552 and 554 are arranged to reduce the data width into 2 bits (i.e. the data bits D0[0] and D0[1]) from the 3 bits of the data line $LDL_0$ in order to form a data width equal to that of the data line $LDL_1$.

Figure 6:
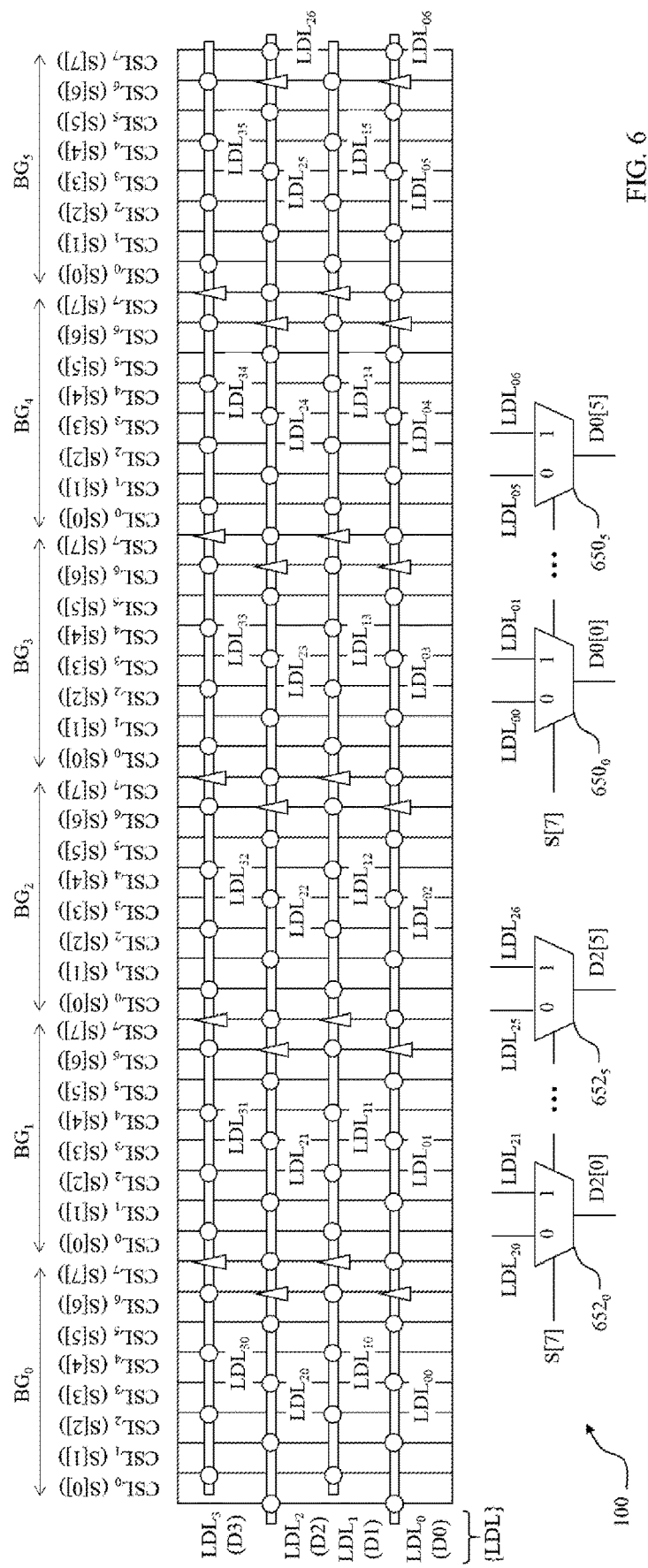
FIG. 6 illustrates an implementation of a portion of the memory device shown in FIG. 1 in accordance with some embodiments of the present disclosure.

FIG. 6 illustrates an implementation of a portion of the memory device 100 shown in FIG. 1 in accordance with some embodiments. The segmentation of the set of data lines {LDL} shown in FIG. 6 can serve as a more generalized embodiment of segmentation of the set of data lines {LDL} shown in FIG. 4. Each data line shown in FIG. 6 can be segmented into more than two line segments according to the method as disclosed in FIG. 4.

Referring to FIG. 6, the set of data lines {LDL} includes a plurality of data lines $LDL_0$-$LDL_3$. The data lines $LDL_0$-$LDL_3$ can be arranged to output the sets of data bits D0-D3, respectively. The number of line segments of the data line $LDL_0/LDL_2$ can be greater than the number of line segments of the data line $LDL_1/LDL_3$ by one. A corresponding set of bitlines (not shown) in each of the bitline groups $BG_0$-$BG_5$ can be selected in response to activation of one of the column select lines $CSL_0$-$CSL_7$. For each bitline group, four bitlines in the selected set of bitlines (not shown) can be coupled to the data lines $LDL_0$-$LDL_3$, respectively when one of the column select signals S[0]-S[7] is activated. For example, a column selection circuit (not shown), implemented based on the column selection circuit 240 shown in FIG. 4, may be configured to receive the column select signals S[0]-S[7] on the column select lines $CSL_0$-$CSL_7$ to control the bitline selection. In addition, each circle can represent a conductive structure arranged for coupling a selected bitline to a corresponding line segment. Each triangle is a gap, and is a symbol to indicate the two adjacent line segments are separated.

In the present embodiment, the segmentation of the data line $LDL_0/LDL_2$ can be implemented based on the segmentation applied to the data line $LDL_0$ shown in FIG. 4. For example, the data line $LDL_0$ can be segmented into a plurality of line segments $LDL_{00}$-$LDL_{06}$. When one of the column select lines $CSL_0$-$CSL_6$ is activated, the selected bitlines in the bitline groups $BG_0$-$BG_5$ are coupled to the line segments $LDL_{00}$-$LDL_{05}$, respectively; when the column select line $CSL_7$ is activated, the selected bitlines in the bitline groups $BG_0$-$BG_5$ are coupled to the line segment $LDL_{01}$-$LDL_{06}$, respectively. Similarly, the data line $LDL_2$ can be segmented into a plurality of line segments $LDL_{20}$-$LDL_{26}$. When one of the column select lines $CSL_0$-$CSL_6$ is activated, the selected bitlines in the bitline groups $BG_0$-$BG_5$ are coupled to the line segments $LDL_{20}$-$LDL_{25}$, respectively; when the column select line $CSL_7$ is activated, the selected bitlines in the bitline groups $BG_0$-$BG_5$ are coupled to the line segment $LDL_{21}$-$LDL_{26}$, respectively.

In addition, the segmentation of the data line $LDL_1/LDL_3$ can be implemented based on the segmentation applied to the data line $LDL_1$ shown in FIG. 4. For example, the data line $LDL_1$ can be segmented into a plurality of line segments $LDL_{10}$-$LDL_{15}$. When one of the column select lines $CSL_0$-$CSL_7$ is activated, the selected bitlines in the bitline groups $BG_0$-$BG_5$ are coupled to the line segments $LDL_{10}$-$LDL_{15}$, respectively. Similarly, the data line $LDL_3$ can be segmented into a plurality of line segments $LDL_{30}$-$LDL_{35}$. When one of the column select lines $CSL_0$-$CSL_7$ is activated, the selected bitlines in the bitline groups $BG_0$-$BG_5$ are coupled to the line segments $LDL_{30}$-$LDL_{35}$, respectively.

Accordingly, the data widths of the data lines $LDL_0$ and $LDL_2$ are 7 bits, and the data widths of the data lines $LDL_1$ and $LDL_3$ are 6 bits. Then, line segments of the data line $LDL_0/LDL_2$ can be multiplexed to implement a data width equal to that of the data line $LDL_1/LDL_3$. In the present embodiment, the memory device 100 may further include a plurality of multiplexer circuits $650_0$-$650_5$ and $652_0$-$652_5$ to implement the line segment multiplexing. Each multiplexer circuit may be disposed outside a sense amplifier region of the memory device 100.

Each of the multiplexer circuits $650_0$-$650_5$ can be configured to select one of two adjacent line segments of the data line $LDL_0$ according to whether the column select line $CSL_7$ is activated. For example, the multiplexer circuit $650_i$ is configured to select one of the line segments $LDL_{0i}$ and $LDL_{0j}$ according to whether the column select line $CSL_7$ is activated, thereby outputting and forming the data bit D0[$i$] of the set of data bits D0, where i=0, . . . , 5, and j=i+1. Similarly, each of the multiplexer circuits $652_0$-$652_5$ can be configured to select one of two adjacent line segments of the data line $LDL_2$ according to whether the column select line $CSL_7$ is activated. For example, the multiplexer circuit $652_i$ is configured to select one of the line segments $LDL_{2i}$ and $LDL_{2j}$ according to whether the column select line $CSL_7$ is activated, thereby outputting and forming the data bit D2[$i$] of the set of data bits D2, where i=0, . . . , 5, and j=i+1. By using the multiplexer circuits $650_0$-$650_5$, the data width of the data line $LDL_0$ is reduced to 6 bits (i.e. D0[0]-D0[5]) from 7 bits, and the data width of the data line $LDL_2$ is reduced to 6 bits (i.e. D2[0]-D2[5]) from 7 bits. Accordingly, the data lines $LDL_0$, $LDL_1$, $LDL_2$ and $LDL_3$ are of uniform data width.

In the example of FIG. 6, each multiplexer circuit can be controlled by the column select signal S[7] on the column select line $CSL_7$. The line segments $LDL_{00}$-$LDL_{05}$ and $LDL_{20}$-$LDL_{25}$ are selected when the column select signal S[7] is logically low. The line segments $LDL_{01}$-$LDL_{06}$ and $LDL_{21}$-$LDL_{26}$ are selected when the column select signal S[7] is logically high. As those skilled in the art can appreciate the data line segmentation shown in FIG. 6 and associated line segment multiplexing after reading the above paragraphs directed to FIG. 1 to FIG. 5, further description is omitted here for brevity.

Figure 7:
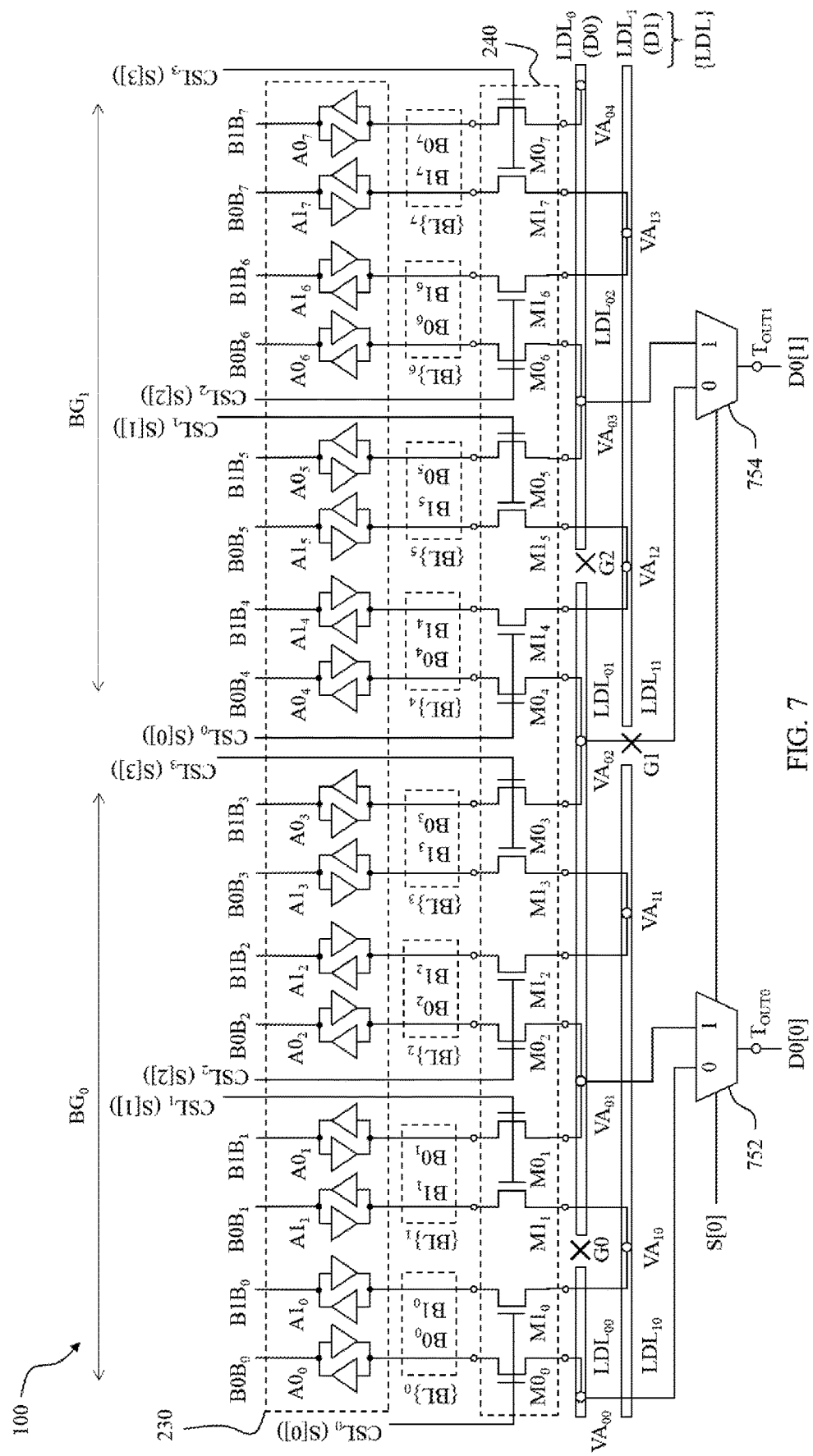
FIG. 7 illustrates an implementation of a portion of the memory device shown in FIG. 1 in accordance with some embodiments of the present disclosure.

The data line segmentation shown in FIG. 4 to FIG. 6 is provided for illustrative purposes, and is not intended to limit the scope of the present disclosure. In some embodiments, the data line $LDL_0$ shown in FIG. 4 and/or FIG. 5 can be split into line segments at other positions without departing from the scope of the present disclosure. FIG. 7 illustrates an implementation of a portion of the memory device 100 shown in FIG. 1 in accordance with some embodiments.

The arrangement of the set of data lines {LDL} shown in FIG. 7 is identical/similar to that shown in FIG. 4 or FIG. 5 except for the locations of the gaps G0 and G2.

In the example of FIG. 7, the gap G0 can be created between the conductive structures $VA_{00}$ and $VA_{01}$, and the gap G2 can be created between the conductive structures $VA_{02}$ and $VA_{03}$. Regarding the bitline group $BG_0$, the bitline $B0_0$ is coupled to the line segment $LDL_{00}$ when selected by the column selection circuit 240, whereas the bitline $B0_1$/$B0_2$/$B0_3$ is coupled to the line segment $LDL_{01}$ when selected by the column selection circuit 240. Regarding the bitline group $BG_1$, the bitline $B0_4$ is coupled to the line segment $LDL_{01}$ when selected by the column selection circuit 240, whereas the bitline $B0_5$/$B0_6$/$B0_7$ is coupled to the line segment $LDL_{02}$ when selected by the column selection circuit 240.

The line segments $LDL_{00}$-$LDL_{02}$ of the data line $LDL_0$ can be multiplexed to implement a data width equal to that of the data line $LDL_1$. For example, the multiplexer circuit 752 can be arranged to couple one of the line segments $LDL_{00}$ and $LDL_{01}$ to the output terminal $T_{OUT0}$ according to whether a predetermined set of bitlines (i.e. the set of bitlines $\{BL\}_0$) is selected. The selection of the line segments $LDL_{00}$ and $LDL_{01}$ can be controlled by the column select signal S[0]. In addition, the multiplexer circuit 754 can be arranged to couple one of the line segments $LDL_{01}$ and $LDL_{02}$ to the output terminal $T_{OUT1}$ according to whether a predetermined set of bitlines (i.e. the set of bitlines $\{BL\}_4$) is selected. The selection of the line segments $LDL_{01}$ and $LDL_{02}$ can be controlled by the column select signal S[0]. As those skilled in the art can appreciate the operation associated with line segment multiplexing shown in FIG. 7 after reading the above paragraphs directed to FIG. 1 to FIG. 6, further description is omitted here for brevity.

Figure 8:
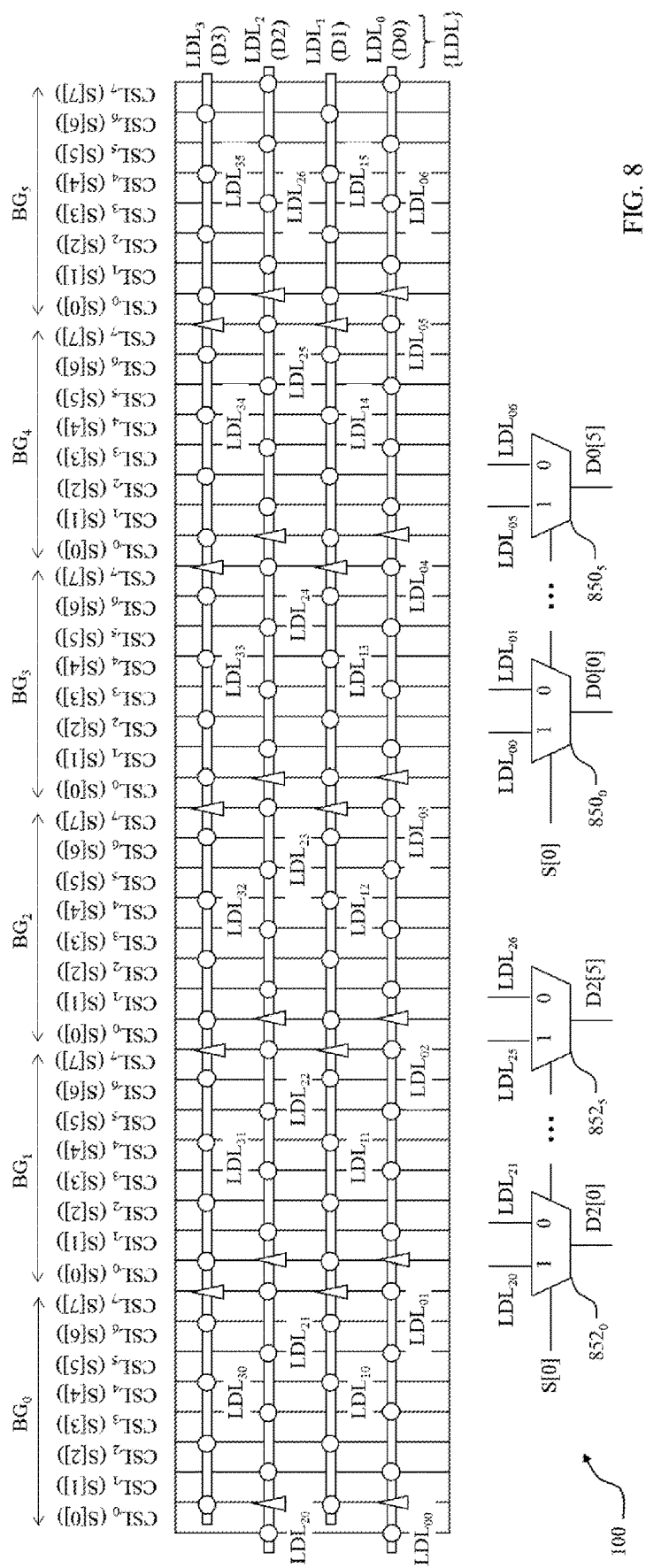
FIG. 8 illustrates an implementation of a portion of the memory device shown in FIG. 1 in accordance with some embodiments of the present disclosure.

FIG. 8 illustrates an implementation of a portion of the memory device 100 shown in FIG. 1 in accordance with some embodiments. The segmentation of the set of data lines {LDL} shown in FIG. 8 can serve as a more generalized embodiment of segmentation of the set of data lines {LDL} shown in FIG. 7. In the present embodiment, the arrangement of the set of data lines {LDL} is substantially identical/similar to that shown in FIG. 6 except for the gap locations associated with the data lines $LDL_0$ and $LDL_2$. In addition, the column select lines $CSL_0$-$CSL_7$ can be used to control the selection of the bitlines included in the bitline groups $BG_0$-$BG_5$ in a manner similar to that described above with reference to FIG. 7.

The segmentation of the data line $LDL_0$/$LDL_2$ can be implemented based on the segmentation applied to the data line $LDL_0$ shown in FIG. 7. For example, the data line $LDL_0$ can be segmented into a plurality of line segments $LDL_{00}$-$LDL_{06}$. When the column select line $CSL_0$ is activated, the selected bitlines in the bitline groups $BG_0$-$BG_5$ are coupled to the line segment $LDL_{00}$-$LDL_{05}$, respectively; when one of the column select lines $CSL_1$-$CSL_7$ is activated, the selected bitlines in the bitline groups $BG_0$-$BG_5$ are coupled to the line segments $LDL_{01}$-$LDL_{06}$, respectively. Similarly, the data line $LDL_2$ can be segmented into a plurality of line segments $LDL_{20}$-$LDL_{26}$. When the column select line $CSL_0$ is activated, the selected bitlines in the bitline groups $BG_0$-$BG_5$ are coupled to the line segment $LDL_{20}$-$LDL_{25}$, respectively; when one of the column select lines $CSL_1$-$CSL_7$ is activated, the selected bitlines in the bitline groups $BG_0$-$BG_5$ are coupled to the line segments $LDL_{21}$-$LDL_{26}$, respectively.

In addition, line segments of the data line $LDL_0$/$LDL_2$ can be multiplexed to implement a data width equal to that of the data line $LDL_1$/$LDL_3$. By way of example but not limitation, the memory device 100 may further include a plurality of multiplexer circuits $850_0$-$850_5$ and $852_0$-$852_5$ to implement the line segment multiplexing. The multiplexer circuit $850_i$ is configured to select one of the line segments $LDL_{0i}$ and $LDL_{0j}$ according to the column select signal S[0] on the column select line $CSL_0$, thereby outputting and forming the data bit D0[$i$] of the set of data bits D0, where i=0, . . . , 5, and j=i+1. Similarly, the multiplexer circuit $852_i$ is configured to select one of the line segments $LDL_{2i}$ and $LDL_{2j}$ according to the column select signal S[0], thereby outputting and forming the data bit D2[$i$] of the set of data bits D2, where i=0, . . . , 5, and j=i+1. The line segments $LDL_{00}$-$LDL_{05}$ and $LDL_{20}$-$LDL_{25}$ are selected when the column select signal S[0] is logically high. The line segments $LDL_{01}$-$LDL_{06}$ and $LDL_{21}$-$LDL_{26}$ are selected when the column select signal S[0] is logically low.

As those skilled in the art can appreciate the data line segmentation shown in FIG. 8 and associated line segment multiplexing after reading the above paragraphs directed to FIG. 1 to FIG. 7, further description is omitted here for brevity.

Figure 9:
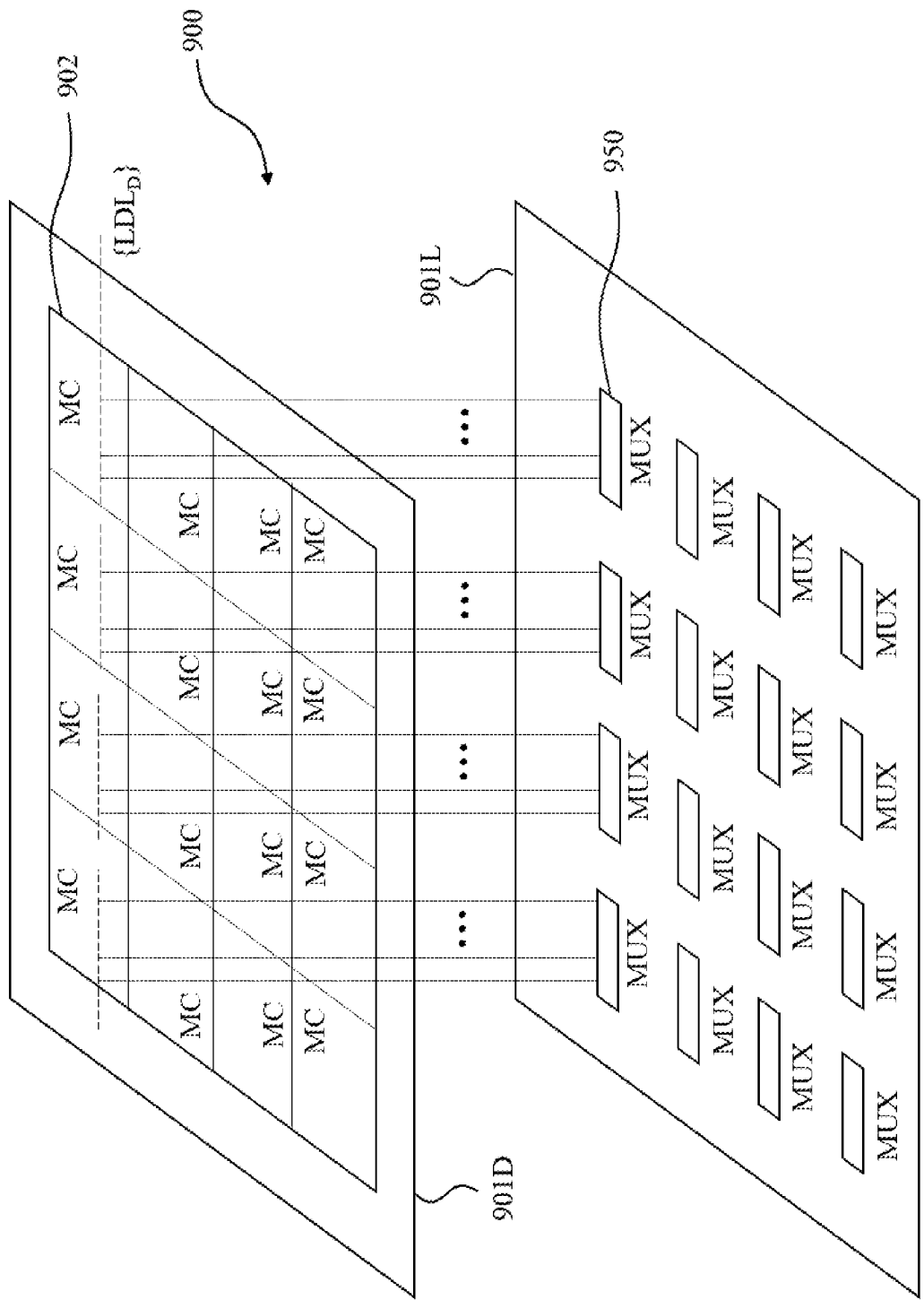
FIG. 9 is a diagram illustrating an exemplary electronic package in accordance with some embodiments of the present disclosure.

FIG. 9 is a diagram illustrating an exemplary electronic package in accordance with some embodiments of the present disclosure. The electronic package 900 can serve as an embodiment of the memory device 100 shown in FIG. 1 which employs the proposed data line segmentation scheme. In the present embodiment, the electronic package 900 may be a memory device implemented using wafer-on-wafer (WoW) technology. The semiconductor substrates (or wafers) 901D and 901L of the electronic package 900 can be stacked one above the other.

A plurality of memory macros (MC) 902 may be formed on the semiconductor substrate 901D. Each memory macro 902 may include one or more memory banks. Each memory bank can include at least one array of tiles that can be implemented using the array of tiles shown in FIG. 1. By way of example but not limitation, each memory macro 902 may be implemented as a DRAM macro, and the semiconductor substrate 901D may be referred to as a DRAM wafer. In addition, a plurality of sets of data lines can be formed on the semiconductor substrate 901D to transmit a plurality of sets of data bits, respectively. Each set of data lines can be segmented based on the proposed data line segmentation scheme. For example, the set of data lines $\{LDL_D\}$ can be implemented using the set of data lines {LDL} shown in FIG. 4 to FIG. 8.

A plurality of multiplexer blocks (MUX) 950 may be formed on the semiconductor substrate 901L, which may be referred to as a logic wafer. Each multiplexer block 950 can include a plurality of multiplexer circuits to implement the line segment multiplexing. By way of example but not limitation, the set of data lines $\{LDL_D\}$ may be implemented to include the set of data lines {LDL} shown in FIG. 5, and the multiplexer block 950 may be implemented to include the multiplexer circuits 552 and 554 shown in FIG. 5. In some embodiments, the multiplexer block 950 may be implemented using the multiplexer circuits $650_0$-$650_5$ and $652_0$-$652_5$ shown in FIG. 6, the multiplexer circuits 752 and 754 shown in FIG. 7, and/or the multiplexer circuits $850_0$-$850_5$ and $852_0$-$852_5$ shown in FIG. 8.

As those skilled in the art can appreciate the data line segmentation shown in FIG. 9 and associated line segment multiplexing after reading the above paragraphs directed to FIG. 1 to FIG. 8, further description is omitted here for brevity.

Figure 10:
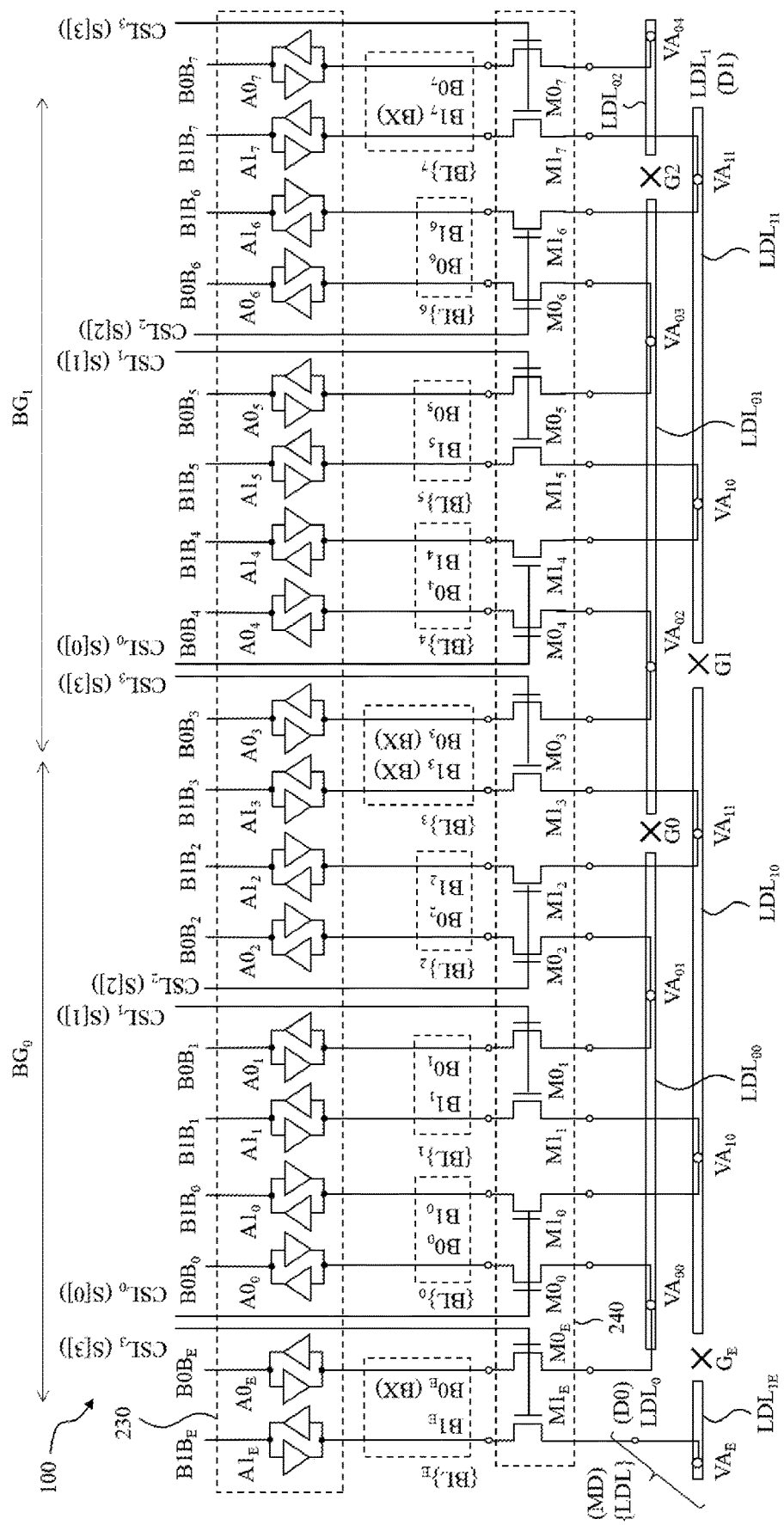
FIG. 10 illustrates an implementation of a portion of the memory device shown in FIG. 1 in accordance with some embodiments of the present disclosure.

FIG. 10 illustrates an implementation of a portion of the memory device 100 shown in FIG. 1 in accordance with some embodiments of the present disclosure. The arrangement of the set of data lines {LDL} shown in FIG. 10 is substantially identical/similar to that shown in FIG. 4 except that the data line $LDL_1$ can further include a line segment $LDL_{1E}$. The line segments $LDL_{1E}$ and $LDL_{10}$ are separated by a gap $G_E$. In addition, the bitline arrangement shown in FIG. 10 is substantially identical/similar to that shown in FIG. 4 except that a set of bitlines $\{BL\}_E$ can be arranged at the left side of the set of bitlines $\{BL\}_0$. The set of bitlines $\{BL\}_E$ can be coupled to the set of data lines {LDL} through the column selection circuit 240 in response to activation of the column select line $CSL_3$.

In the present embodiment, the sense amplifier block 230 can further include sense amplifiers $A0_E$ and $A1_E$, each of which can be implemented using a pair of cross-coupled inverters. The sense amplifier $A0_E$ is coupled to the bitline BOE and the complementary bitline $B0B_E$, and the sense amplifier $A1_E$ is coupled to the bitline $B1_E$ and the complementary bitline $B1B_E$. The column selection circuit 240 can be configured to selectively couple the set of bitlines $\{BL\}_E$ to the data lines {LDL} according to the column select signal S[3]. For example, the column selection circuit 240 may include transistors $M0_E$ and $M1_E$. The transistor $M0_E$ is arranged for selectively coupling the bitline $B0_E$ to the data line $LDL_{00}$ through the conductive structure $VA_{00}$ according to the column select signal S[3]; the transistor $M1_E$ is arranged for selectively coupling the bitline $B1_E$ to the data line $LDL_{1E}$ through the conductive structure $VA_E$ according to the column select signal S[3].

In the example of FIG. 10, the sets of bitlines $\{BL\}_E$ and $\{BL\}_0$-$\{BL\}_7$ can be utilized to implement two bitline groups $BG_0$ and $BG_1$. The bitline group $BG_0$ includes the sets of bitlines $\{BL\}_0$-$\{BL\}_2$, and the bitlines $B0_E$ and $B1_3$. The bitlines $B0_E$ and $B1_3$ can be regarded as being included in the same set of bitlines BX since both of them can be selected in response to activation of the same column select line $CSL_3$. In addition, a first bitline in the set of bitlines $\{BL\}_0/\{BL\}_1/\{BL\}_2$ (e.g. the bitline $B0_0/B0_1/B0_2$) and a first bitline in the set of bitlines BX (e.g. the bitline $B0_E$) are selectively coupled to the line segment $LDL_{00}$ through the column selection circuit 240; a second bitline in the set of bitlines $\{BL\}_0/\{BL\}_1/\{BL\}_2$ (e.g. the bitline $B1_0/B1_1/B1_2$) and a second bitline in the set of bitlines BX (e.g. the bitline $B1_3$) are selectively coupled to the line segment $LDL_{10}$ through the column selection circuit 240. The set of bitlines $\{BL\}_0/\{BL\}_1/\{BL\}_2$ is arranged between the first bitline and the second bitline in the set of bitlines BX.

The bitline group $BG_1$ includes the sets of bitlines $\{BL\}_4$-$\{BL\}_6$, and the bitlines $B0_3$ and $B1_7$. Similarly, the bitlines $B0_3$ and $B1_7$ can be regarded as being included in the set of bitlines BX since both of them can be selected in response to activation of the same column select line $CSL_3$. The set of bitlines $\{BL\}_4/\{BL\}_5/\{BL\}_6$ is arranged between the bitlines $B0_3$ and $B1_7$ in the set of bitlines BX.

In operation, when one of the column select lines $CSL_0$-$CSL_3$ is activated, the other column select lines are inactivated. The column selection circuit 240 can couple a corresponding set of bitlines in each bitline group to the set of data lines {LDL} to thereby transmit the memory data MD, which may be inputted to or outputted from a cell array. The data line $LDL_0$ can be arranged to transmit (i.e. output or input) a set of data bits D0 of the memory data MD, and the data line $LDL_1$ can be arranged to transmit a set of data bits D1 of the memory data MD.

For example, when the set of bitlines $\{BL\}_0/\{BL\}_1/\{BL\}_2$ in the bitline group $BG_0$ is selected in response to activation of a corresponding column select line (i.e. one of the column select lines $CSL_0$-$CSL_2$), the column selection circuit 240 can couple the bitline $B0_0/B0_1/B0_2$ to the line segment $LDL_{00}$ to thereby transmit (e.g. output or input) a predetermined data bit of the set of data bits D0, and couple the bitline $B1_0/B1_1/B1_2$ to the line segment $LDL_{10}$ to thereby transmit a predetermined data bit of the set of data bits D1. In addition, when the set of bitlines BX is selected, the column selection circuit 240 can couple the bitline BOE in the bitline group $BG_0$ to the line segment $LDL_{00}$ to thereby transmit the predetermined data bit of the set of data bits D0, and couple the bitline $B1_3$ in the bitline group $BG_0$ to the line segment $LDL_{10}$ to thereby transmit the predetermined data bit of the set of data bits D1.

With regard to the bitline group $BG_1$, when the set of bitlines $\{BL\}_4/\{BL\}_5/\{BL\}_6$ in the bitline group $BG_1$ is selected in response to activation of a corresponding column select line (i.e. one of the column select lines $CSL_0$-$CSL_2$), the column selection circuit 240 can couple the bitline $B0_4/B0_5/B0_6$ to the line segment $LDL_{01}$ to thereby transmit another predetermined data bit of the set of data bits D0, and couple the bitline $B1_4/B1_5/B1_6$ to the line segment $LDL_{11}$ to thereby transmit another predetermined data bit of the set of data bits D1. In addition, when the set of bitlines BX is selected, the column selection circuit 240 can couple the bitline $B0_3$ to the line segment $LDL_{01}$ to thereby transmit the another predetermined data bit of the set of data bits D0, and couple the bitline $B1_7$ to the line segment $LDL_{11}$ to thereby transmit the another predetermined data bit of the set of data bits D1. Note that the bitlines $B1_3$ and $B0_3$ in the same set of bitlines BX are adjacent to each other, while belong to different bitline groups.

Accordingly, by arranging the line segment $LDL_{1E}$ and related circuits (e.g. the set of bitlines $\{BL\}_E$) at the left side of the memory device 100, the data line $LDL_0$ and $LDL_1$ can have uniform data width (i.e. 2 bits) without using additional multiplexers in FIG. 5.

Figure 11A:
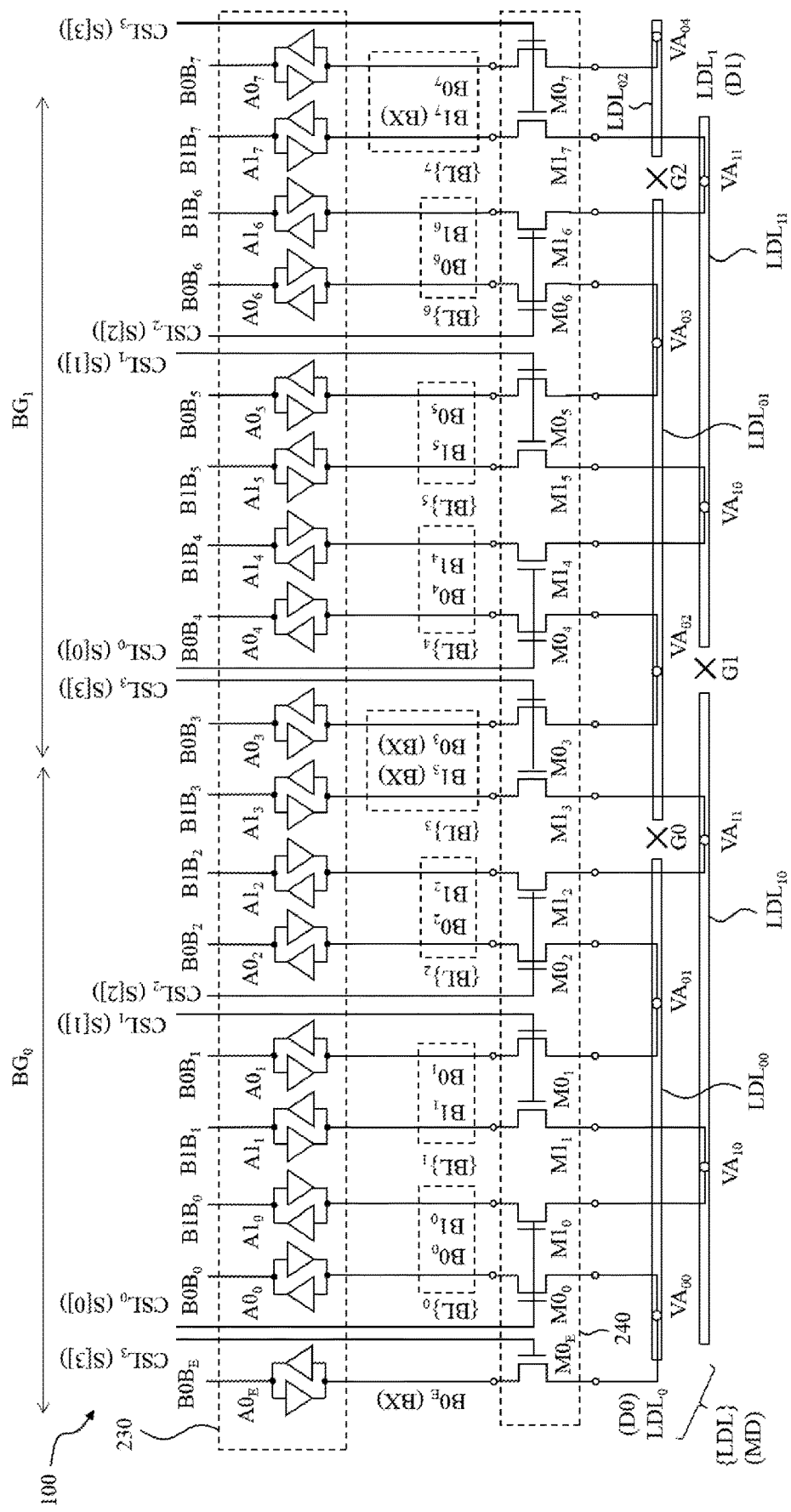
FIG. 11A illustrates an implementation of a portion of the memory device shown in FIG. 1 in accordance with some embodiments of the present disclosure.

In some embodiments, the line segment $LDL_{1E}$ shown in FIG. 10 may be optional when the bitline group $BG_0$ is the leftmost one among bitline groups of the memory device 100. Thus, the associated elements (e.g. the bitline $B1_E$, the complementary bitline $B1B_E$, the sense amplifier $A1_E$, the transistor $M1_E$ and the conductive structure $VA_E$) can be omitted, as illustrated in FIG. 11A.

In some embodiments, the line segment $LDL_{02}$ shown in FIG. 10 may be optional when the bitline group $BG_1$ is the rightmost one among bitline groups of the memory device 100. Thus, the associated elements (e.g. the bitline $B0_7$, the complementary bitline $B0B_7$, the sense amplifier $A0_7$, the transistor $M0_7$ and the conductive structure $VA_{O4}$) can be omitted, as illustrated in FIG. 11B.

Figure 11B:
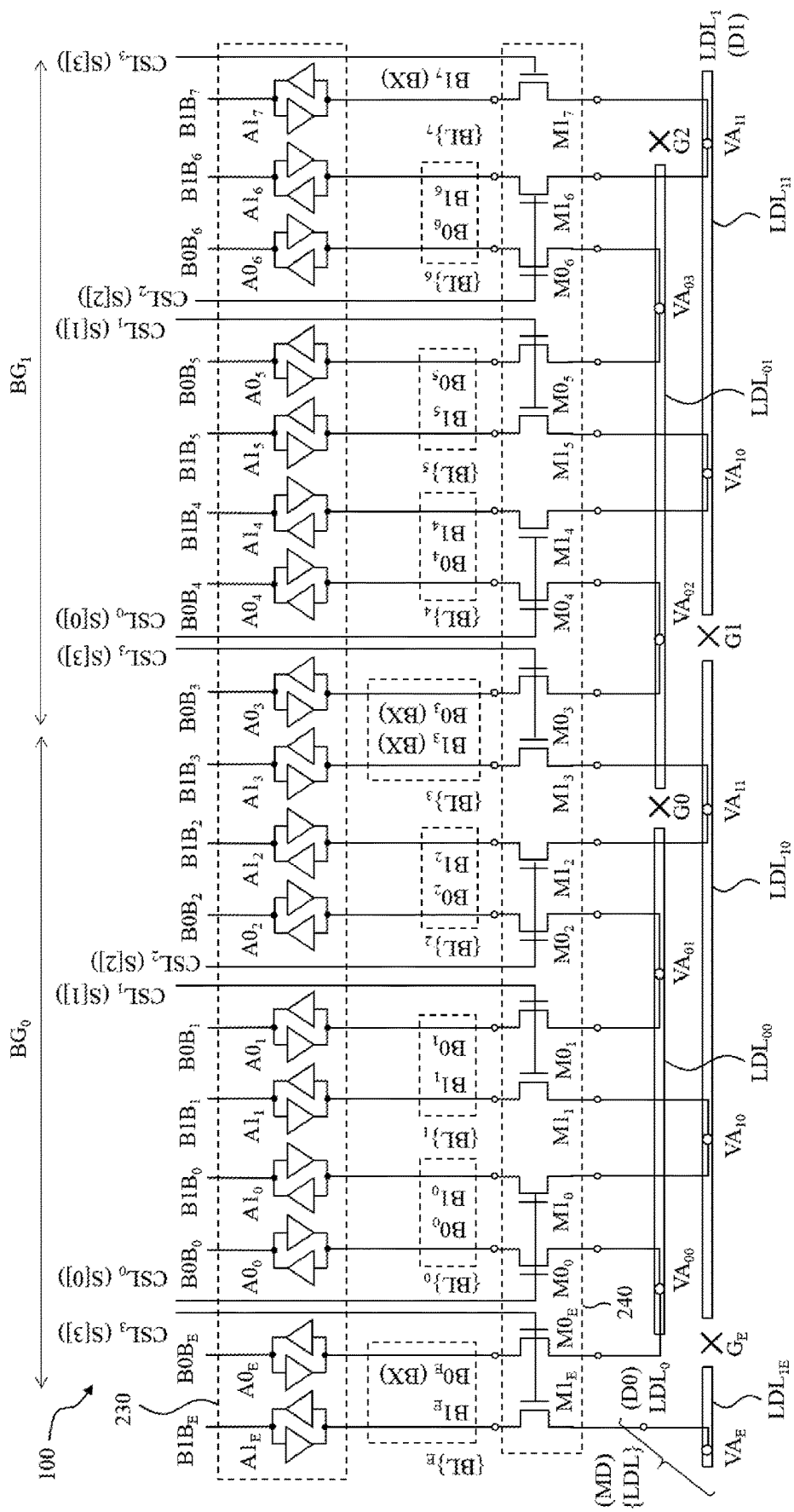
FIG. 11B illustrates an implementation of a portion of the memory device shown in FIG. 1 in accordance with some embodiments of the present disclosure.

As those skilled in the art can appreciate the data line segmentation shown in FIG. 10 to FIG. 11B and associated data access operation after reading the above paragraphs directed to FIG. 1 to FIG. 9, further description is omitted here for brevity.

Figure 12:
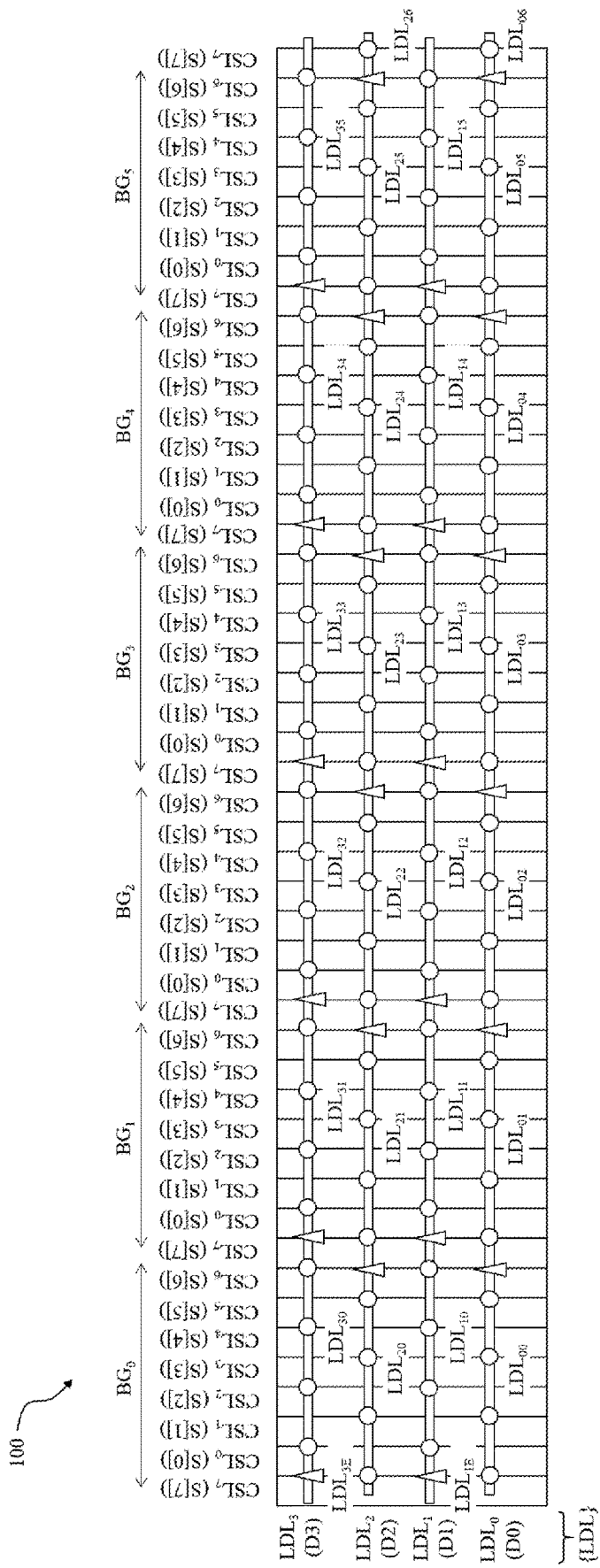
FIG. 12 illustrates an implementation of a portion of the memory device shown in FIG. 1 in accordance with some embodiments of the present disclosure.

FIG. 12 illustrates an implementation of a portion of the memory device 100 shown in FIG. 1 in accordance with some embodiments. The segmentation of the set of data lines {LDL} shown in FIG. 12 can serve as a more generalized embodiment of segmentation of the set of data lines {LDL} shown in FIG. 10. Each data line can be segmented into more than two line segments. The arrangement of the data lines and bitlines shown in FIG. 12 is substantially identical/similar to that shown in FIG. 6 except that, in each bitline group, bitlines selected in response to activation of the column select lines $CSL_7$ are arranged at opposite sides of the bitline group. In addition, in some embodiments, the line segment $LDL_{1E}$ included in the data line $LDL_1$ may be optional; in some embodiments, the line segment $LDL_{3E}$ included in the data line $LDL_3$ may be optional. As those skilled in the art can appreciate the data line segmentation shown in FIG. 12 and associated data access operation after reading the above paragraphs directed to FIG. 1 to FIG. 11B, further description is omitted here for brevity.

Briefly, by dividing a data line into multiple segments without cutting a shared conductive structure on the data line, the cost of a memory device is relatively low in comparison to the counterpart illustrated in FIG. 3. Moreover, with the use of the proposed data line segmentation scheme, a set of data lines of a memory device can be segmented into line segments to increase memory bandwidth without introducing physical gaps and/or dummy columns in a memory cell array. Each data line can be segmented into two or more line segments to implement a high bandwidth memory device. Data lines that have different numbers of line segments can be of a uniform data width with the use of line segment multiplexing, which can be implemented outside a sense amplifier region to maintain high memory cell density, or by adding a line segment and related circuits at a side of a data line as shown in FIG. 10.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
a plurality of sets of bitlines, comprising a first set of bitlines and a second set of bitlines;
a set of data lines, each data line being segmented into a plurality of line segments separated from each other, the set of data lines comprising a first data line and a second data line, wherein the first data line comprises a first line segment and a second line segment adjacent to each other, and the second data line comprises a first line segment; and
a column selection circuit, configured to selectively couple a first bitline in the first set of bitlines and a first bitline in the second set of bitlines to the first line segment and the second line segment of the first data line, respectively, and to selectively couple a second bitline in the first set of bitlines and a second bitline in the second set of bitlines to the first line segment of the second data line,
wherein the first line segment and the second line segment of the first data line are arranged along a first direction, and the first data line and the second data line are spaced apart along a second direction orthogonal to the first direction.

2. The memory device of claim 1, wherein the first data line is segmented into a first number of line segments, the second data line is segmented into a second number of line segments, and the second number is different from the first number.

3. The memory device of claim 1, wherein the first data line is segmented into a first number of line segments, and the second data line is segmented into a second number of line segments; each of the first number and the second number is greater than two.

4. The memory device of claim 1, wherein the column selection circuit is configured to select one set of bitlines from among the sets of bitlines; when the first set of bitlines is selected, the column selection circuit is configured to couple the first bitline in the first set of bitlines to the first line segment of the first data line to transmit a predetermined data bit; when the second set of bitlines is selected, the column selection circuit is configured to couple the first bitline in the second set of bitlines to the second line segment of the first data line to transmit the predetermined data bit.

5. The memory device of claim 1, wherein the column selection circuit is configured to select one set of bitlines from among the sets of bitlines; when the first set of bitlines is selected, the column selection circuit is configured to couple the first bitline in the first set of bitlines to the first line segment of the first data line to transmit a predetermined data bit; when the second set of bitlines is selected, the column selection circuit is configured to couple a third bitline in the second set of bitlines to the first line segment of the first data line to transmit the predetermined data bit.

6. The memory device of claim 5, wherein the first bitline in the first set of bitlines is arranged between the third bitline and the first bitline in the second set of bitlines.

7. The memory device of claim 1, wherein the sets of bitlines further comprises a third set of bitlines, and the column selection circuit is configured to select one set of bitlines from among the set of bitlines; when the third set of bitlines is selected, the column selection circuit is further configured to couple a first bitline in the third set of bitlines to the second line segment of the first data line, and couple a second bitline in the third set of bitlines to a second line segment of the second data line adjacent to the first line segment of the second data line.

8. The memory device of claim 1, wherein the column selection circuit is configured to select one set of bitlines from among the set of bitlines; when the first set of bitlines is selected, the column selection circuit is configured to couple a third bitline in the first set of bitlines to the second line segment of the first data line, and couple a fourth bitline in the first set of bitlines to a second line segment of the second data line adjacent to the first line segment of the second data line.

9. The memory device of claim 1, wherein the column selection circuit is configured to select one set of bitlines from among the set of bitlines; when the second set of bitlines is selected, the column selection circuit is configured to couple a third bitline in the second set of bitlines to a third line segment of the first data line adjacent to the second line segment of the first data line, and couple a fourth bitline in the second set of bitlines to a second line segment of the second data line adjacent to the first line segment of the second data line.

10. The memory device of claim 9, further comprising:
a first multiplexer circuit, having a first output terminal, the first multiplexer circuit being configured to couple one of the first line segment and the second line segment of the first data line to the first output terminal according to whether the second set of bitlines is selected; and
a second multiplexer circuit, having a second output terminal, the second multiplexer circuit being configured to couple one of the second line segment and the third line segment of the first data line to the second output terminal according to whether the second set of bitlines is selected.

11. The memory device of claim 10, further comprising:
a first semiconductor substrate and a second semiconductor substrate stacked one above other, wherein the set of data lines is formed on the first semiconductor substrate, and the first multiplexer circuit and the second multiplexer circuit are formed on the second semiconductor substrate.

12. The memory device of claim 10, wherein the first output terminal of the first multiplexer circuit and the second output terminal of the second multiplexer circuit form a first data width, the second data line forms a second data width, and the first data width is equal to the second data width.

13. A memory device, comprising:
a first bitline group and a second bitline group, each bitline group comprising a plurality of sets of bitlines;
a first data line, segmented into a plurality of line segments separated from each other, the first data line being arranged to transmit a first set of data bits;
a second data line, segmented into a plurality of line segments separated from each other, the second data line being arranged to transmit a second set of data bits; and
a column selection circuit, configured to selectively couple the sets of bitlines in the first bitline group to a first line segment and a second line segment of the first data line, and to a first line segment of the second data line; the column selection circuit being further configured to selectively couple the sets of bitlines in the second bitline group to the second line segment and a third line segment of the first data line, and to a second line segment of the second data line,
wherein the plurality of line segments of the first data line are arranged along a first direction, the plurality of line segments of the second data line are arranged along the first direction, and the first data line and the second data line are spaced apart along a second direction orthogonal to the first direction.

14. The memory device of claim 13, wherein the column selection circuit is arranged to select one set of bitlines from among the plurality of sets of bitlines in each bitline group, and to couple the selected set of bitlines to the first data line and the second data line;
when a first set of bitlines in each bitline group is selected, a first bitline and a second bitline in the first set of bitlines in the first bitline group are coupled to the first line segment of the first data line and the first line segment of the second data line to transmit a first data bit in the first set of data bits and a first data bit in the second set of data bits, respectively, and a first bitline and a second bitline in the first set of bitlines in the second bitline group are coupled to the second line segment of the first data line and the second line segment of the second data line to transmit a second data bit in the first set of data bits and a second data bit in the second set of data bits, respectively; and
when a second set of bitlines in each group of bitlines is selected, a first bitline and a second bitline in the second set of bitlines in the first bitline group are coupled to the second line segment of the first data line and the first line segment of the second data line to transmit the first data bit in the first set of data bits and the first data bit in the second set of data bits, respectively, and a first bitline and a second bitline in the second set of bitlines in the second bitline group are coupled to the third line segment of the first data line and the second line segment of the second data line to transmit the second data bit in the first set of data bits and the second data bit in the second set of data bits, respectively.

15. The memory device of claim 13, further comprising:
a first multiplexer circuit, having a first output terminal, the first multiplexer circuit being configured to output a first data bit in the first set of data bits by coupling one of the first line segment and the second line segment of the first data line to the first output terminal; and
a second multiplexer circuit, having a second output terminal, the second multiplexer circuit being configured to output a second data bit in the first set of data bits by coupling one of the second line segment and the third line segment of the first data line to the second output terminal.

16. The memory device of claim 15, wherein the column selection circuit is arranged to select one set of bitlines from among the plurality of sets of bitlines in each bitline group, and to couple the selected set of bitlines to the first data line and the second data line;
when a predetermined set of bitlines in each bitline group is unselected, the first multiplexer circuit is configured to couple the first line segment of the first data line to the first output terminal, and the second multiplexer circuit is configured to couple the second line segment of the first data line to the second output terminal; and
when the predetermined set of bitlines in each bitline group is selected, the first multiplexer circuit is configured to couple the second line segment of the first data line to the first output terminal, and the second multiplexer circuit is configured to couple the third line segment of the first data line to the second output terminal.

17. The memory device of claim 15, further comprising:
a first semiconductor substrate and a second semiconductor substrate stacked one above other, wherein the first data line is formed on the first semiconductor substrate, and each of the first multiplexer circuit and the second multiplexer circuit is formed on the second semiconductor substrate.

18. A memory device, comprising:
a plurality of sets of bitlines, comprising a first set of bitlines and a second set of bitlines;
a first data line and a second data line, each data line being segmented into a plurality of line segments separated from each other; and
a column selection circuit, configured to selectively couple a first bitline in the first set of bitlines and a first bitline in the second set of bitlines to a first line segment of the first data line, and to selectively couple a second bitline in the first set of bitlines and a second bitline in the second set of bitlines to a first line segment of the second data line; the first set of bitlines being arranged between the first bitline and the second bitline in the second set of bitlines.

19. The memory device of claim 18, wherein the column selection circuit is arranged to select one set of bitlines from among the sets of bitlines, and to couple the selected set of bitlines to the first data line and the second data line; when the second set of bitlines is selected, the column selection circuit is configured to couple a third bitline and a fourth bitline in the second set of bitlines to a second line segment of the first data line and a second line segment of the second data line, respectively; the third bitline and the second bitline in the second set of bitlines are adjacent to each other.

20. The memory device of claim 19, wherein the second bitline in the second set of bitlines is further adjacent to the second bitline in the first set of bitlines, and arranged between the second bitline in the first set of bitlines and the third bitline in the second set of bitlines.

\* \* \* \* \*